(12) United States Patent
Akimori et al.

(10) Patent No.: US 6,990,388 B2
(45) Date of Patent: Jan. 24, 2006

(54) MASS-PRODUCTION TRANSFER SUPPORT SYSTEM AND SEMICONDUCTOR MANUFACTURING SYSTEM

(75) Inventors: Hiroyuki Akimori, Tokyo (JP); Yasushi Ohyama, Kanagawa (JP); Hidetaka Nishimura, Gifu (JP); Shigeru Kobayashi, Kanagawa (JP)

(73) Assignee: Renesas Technology Corp., Tokyo (JP)

( * ) Notice: Subject to any disclaimer, the term of this patent is extended or adjusted under 35 U.S.C. 154(b) by 0 days.

(21) Appl. No.: 11/020,395

(22) Filed: Dec. 27, 2004

(65) Prior Publication Data
US 2005/0143853 A1 Jun. 30, 2005

(30) Foreign Application Priority Data
Dec. 26, 2003 (JP) ............................. 2003-432464
Dec. 26, 2003 (JP) ............................. 2003-432465

(51) Int. Cl.
*G06F 19/00* (2006.01)
(52) U.S. Cl. ................... 700/121; 700/117; 708/190; 438/5
(58) Field of Classification Search .................. 700/90, 700/95, 108, 117, 121; 708/190; 438/5
See application file for complete search history.

(56) References Cited

U.S. PATENT DOCUMENTS

| 5,235,271 | A | 8/1993 | Kira |
| 6,000,830 | A | 12/1999 | Asano et al. |
| 6,459,950 | B1 * | 10/2002 | Kawazome ................. 700/121 |
| 6,738,747 | B1 * | 5/2004 | Tanaka et al. ................. 705/9 |
| 2002/0123818 | A1 * | 9/2002 | Yamada et al. ............. 700/121 |
| 2003/0023560 | A1 | 1/2003 | Soma |
| 2003/0045961 | A1 | 3/2003 | Nakao |
| 2003/0069658 | A1 | 4/2003 | Yamazaki |
| 2003/0069659 | A1 | 4/2003 | Wada et al. |

FOREIGN PATENT DOCUMENTS

| JP | 10-135098 | 5/1998 |
| JP | 10-232874 | 9/1998 |
| JP | 11-150047 | 6/1999 |
| JP | 2002-312375 | 10/2002 |
| JP | 2003-077785 | 3/2003 |

OTHER PUBLICATIONS http://www.intel.co.jp/jp/intel/pr/press98/025FLASH.htm, Intel Press Release, "Production of flash memory using 0.25-micron process", Dec. 9, 2003.
http://www.intel.co.jp/jp/intel/pr/press2000/000424b.htm, Intel Press Release, "Intel announces first Production of flash memory using 0.18-micron process", Nov. 4, 2004.

* cited by examiner

*Primary Examiner*—Jayprakash N. Gandhi
(74) *Attorney, Agent, or Firm*—Leydig, Voit & Mayer, Ltd.

(57) ABSTRACT

A mass-production transfer support system has a mass-production transfer source managing computer for managing information generated in a trial-production process of a semiconductor device and a mass-production transfer destination managing computer for managing a mass-production process of the semiconductor device. The mass-production transfer source managing computer comprises: quality/recipe information input accepting means; quality/recipe information sending means; apparatus-difference correction information input accepting means for accepting an input of apparatus-difference correction information for correcting a difference in the quality of the semiconductor device associated with an apparatus-difference between semiconductor manufacturing apparatuses; apparatus-difference correction information storing means; and apparatus-difference correction information providing means for storing the apparatus-difference correction information in a database accessible by the mass-production transfer destination managing computer.

17 Claims, 21 Drawing Sheets

Fig. 2

◎QUALITY INFORMATION / RECIPE INFORMATION
[PRODUCT NAME]
○ BASIC DOCUMENT DATA
- PROCESS SPECIFICATION
- LAYOUT RULES
- TEG DESIGN
- PQC
 - LIST AND RECORDS
 - MEASURING POSITION INFORMATION
  (WAFER IN-PLANE POSITION, IN-CHIP POSITION)
 - GROUNDS FOR MEASURING POSITION
 - EVALUATION RESULT OF GATE PRESSURE TIGHT MASK
- HISTORY OF CHANGE/MODIFICATION OF LAYOUT/MASK
 AND REASONS THEREFOR
○ DEVICE CHARACTERISTIC DATA
- CHARACTERRISTICS OF TRANSISTORS, CAPACITANCE AND RESISTANCE
- OPERATION MARGIN AND RELIABILITY
○ DIMENSIONS/FILM THICKNESS DATA
○ RECIPE DATA FOR MANUFACTURING APPARATUS

Fig. 3

◎APPARATUS-DIFFERENCE CORRECTION INFORMATION
[PRODUCT, WAFER ID]
○ ELEMENTAL TECHNOLOGY DATA
- PROCESS MARGIN
- OPTIMIZATION OF PROCESS CONDITION
- SHOT MATRIX (INCLUDING DUMMY SHOT)
- EDGE DESIGN
- OPENING RATIO OF LAYERS
○ NEWLY DEVELOPED CONTENTS RELATED DATA
- DEVELOPMENT BACKGROUND AND CONTENTS OF NEWLY DEVELOPED
 TECHNOLOGY
- ADJUSTMENTS ON DEVELOPMENT
- CONFIRMATION OF DEVELOPEMENT COMPLETION
- NEWLY INTRODUCED EQUIPMENT AND ITS SAFETY
- NEWLY INTRODUCED MATERIAL, ITS QUALIFICATION AND SAFETY
- SECTIONAL SEM PHOTO OF NEW DEVICE STRUCTURE PORTION
○ FORM FITTING DATA
○ DEVICE CHARACTERISTIC FITTING DATA
- SPACER FORM ADJUSTMENT
- LINE WIDTH ADJUSTMENT
- GATE LENGTH ADJUSTMENT
- ION IMPLANTATION CONDITION ADJUSTMENT
○ MASK CREATION DATA
○ APPARATUS DETAIL DATA
- PERATION DETAIL
 (PROCESSED QUANTITY, NPW, CLEANING AND MAINTENANCE)
- APPARATUS CONFIGURATION, PLACEMENT STATUS
- PROCESS MONITOR INFORMATION (LIGHT EMITTING MONITOR)
- PARTICLE INFORMATION

Fig. 20

◎APPARATUS-DIFFERENCE CORRECTION INFORMATION
　[PRODUCT, WAFER ID]
　　○ELEMENTAL TECHNOLOGY DATA
　　　C・PROCESS MARGIN
　　　　・OPTIMIZATION OF PROCESS CONDITION
　　　　・SHOT MATRIX (INCLUDING DUMMY SHOT)
　　　　・EDGE DESIGN
　　　　・OPENING RATIO OF LAYERS
　　○NEWLY DEVELOPED CONTENTS RELATED DATA
　　　　・DEVELOPMENT BACKGROUND AND CONTENTS OF NEWLY DEVELOPED TECHNOLOGY
　　　D・ADJUSTMENTS ON DEVELOPMENT
　　　　・CONFIRMATION OF DEVELOPEMENT COMPLETION
　　　　・NEWLY INTRODUCED EQUIPMENT AND ITS SAFETY
　　　　・NEWLY INTRODUCED MATERIAL, ITS QUALIFICATION AND SAFETY
　　　　・SECTIONAL SEM PHOTO OF NEW DEVICE STRUCTURE PORTION
　　○FORM FITTING DATA
　　○DEVICE CHARACTERISTIC FITTING DATA
　　　A・SPACER FORM ADJUSTMENT
　　　B・LINE WIDTH ADJUSTMENT
　　　　・GATE LENGTH ADJUSTMENT
　　　　・ION IMPLANTATION CONDITION ADJUSTMENT
　　○MASK CREATION DATA
　　○APPARATUS DETAIL DATA
　　　　・PERATION DETAIL
　　　　　(PROCESSED QUANTITY, NPW, CLEANING AND MAINTENANCE)
　　　　・APPARATUS CONFIGURATION, PLACEMENT STATUS
　　　　・PROCESS MONITOR INFORMATION (LIGHT EMITTING MONITOR)
　　　　・PARTICLE INFORMATION

MASS-PRODUCTION TRANSFER SUPPORT SYSTEM AND SEMICONDUCTOR MANUFACTURING SYSTEM

FIELD OF THE INVENTION

The present invention relates to a mass-production transfer support system for supporting a mass-production transfer of a semiconductor device to a mass-production process, and relates to a semiconductor manufacturing system for performing the mass-production transfer of the semiconductor device.

DESCRIPTION OF THE BACKGROUND ART

In recent years, a number of semiconductor device manufacturers are manufacturing system LSIs represented by an SOC (system on chip) as main products. As for the system LSIs, there are many cases where the number of units manufactured in lifetime is decided at a start of manufacturing. For this reason, in order for the semiconductor device manufacturers to obtain as much profit as possible, it is important, even in the case of producing a new product, to perform production with a proper input from the beginning and finish the production in a short period of time. Therefore, it is required to perform a mass-production transfer promptly after completion of a prototype.

Conventionally, the mass-production transfer of the new product is performed by transferring quality information and recipe information. As for the mass-production transfer in reality, however, it is not sufficient to transfer the quality information and recipe information. This is because a quality of a semiconductor device is different depending on a difference between semiconductor manufacturing apparatus (hereafter, referred to as a "manufacturing apparatus") manufacturers or a difference between specifications of the manufacturing apparatuses, that is, a "apparatus-difference" existing between the manufacturing apparatuses.

As for a method of solving the problem of the apparatus-difference, Copy Exactly of Intel Corporation, U.S. is known. See "First flash memory in the industry produced by 0.25 micron process" dated Feb. 3, 1998 and retrieved on the Internet on Dec. 9, 2003 <URL: http://www.intel.co.jp/jp/intel/pr/press98/025FLASH.htm>. This method is intended to reduce occurrences of the apparatus-difference as much as possible by purchasing large quantities of the manufacturing apparatuses of the same manufacturer at a time and further matching the specifications of the manufacturing apparatuses in detail.

However, the above-mentioned method requires an enormous amount of investment at a time, and so most semiconductor device manufacturers cannot adopt it in reality.

Therefore, on a mass-production transfer in reality, the engineers having engaged in development and trial-production of the new product are dispatched to a mass-production transfer destination to solve the problem of the apparatus-difference. To be more specific, the problem of the apparatus-difference is absorbed by using know-how held unrecorded by the engineers, and a quality equivalent to the prototype is realized at the mass-production transfer destination so as to transfer the mass-production.

As a semiconductor manufacturing process uses a lot of microfabrication, it is apt to be influenced by the apparatus-difference in comparison with other fields of manufacturing. Therefore, it is essential to absorb the problem of the apparatus-difference.

SUMMARY OF THE INVENTION

The present invention has been conceived to solve the previously-mentioned problems and a general object of the present invention is to provide novel and useful mass-production transfer support system and is to provide novel and useful semiconductor manufacturing system.

More specific object of the present invention is to provide a mass-production transfer support system and a semiconductor manufacturing system capable of a smooth mass-production transfer of a semiconductor device. The above object of the present invention is attained by a following semiconductor device and a following method for manufacturing a semiconductor device.

According to one aspect of the present invention, the mass-production transfer support system has a mass-production transfer source managing computer for managing information generated or obtained in a trial-production process of a semiconductor device, the mass-production transfer source managing computer being connected via a network to a mass-production transfer destination managing computer for managing a mass-production process of the semiconductor device, wherein the mass-production transfer source managing computer comprises: quality/recipe information input accepting means for accepting an input of quality information representing a quality of the semiconductor device and an input of recipe information for realizing the quality of the semiconductor device; quality/recipe information sending means for sending the quality and recipe information accepted by the quality/recipe information input accepting means to the mass-production managing computer via the network; apparatus-difference correction information input accepting means for accepting an input of apparatus-difference correction information for correcting a difference in the quality of the semiconductor device associated with an apparatus-difference between semiconductor manufacturing apparatuses in charge of an element process of the semiconductor device; apparatus-difference correction information storing means for storing the apparatus-difference correction information accepted by the apparatus-difference correction information input accepting means in a predetermined storage device; and apparatus-difference correction information providing means for reading from the storage device the apparatus-difference correction information stored in the storage device by the apparatus-difference correction information storing means, and for storing the apparatus-difference correction information in a database accessible by the mass-production transfer destination managing computer, and wherein the mass-production transfer destination managing computer comprises: quality/recipe information receiving means for receiving via the network the quality and recipe information sent by the quality/recipe information sending means of the mass-production transfer source managing computer; and quality and recipe information storing means for storing the quality and recipe information received by the quality/recipe information receiving means in the predetermined storage device According to another aspect of the present invention, the semiconductor manufacturing system has a trial-production managing computer for managing information generated or obtained in a trial-production process of a semiconductor device connected via a network to a mass-production managing computer for managing a mass-production process of the semiconductor device, wherein the trial-production managing computer comprises: quality/recipe information input accepting means for accepting an input of quality information representing a quality of a semiconductor device and an input of recipe information for realizing the quality of the semiconductor device; quality/recipe information sending means f or sending the quality and recipe information accepted by the quality/recipe information input accepting means to the mass -production managing computer via the network; apparatus-difference correction information input accepting means for accepting an input of apparatus-difference correction information for correcting a difference in the quality of the semiconductor device associated with an apparatus-difference between semiconductor manufacturing apparatuses in charge of an element process of the semiconductor device; apparatus-difference correction information storing means for storing the apparatus-difference correction information accepted by the apparatus-difference correction information input accepting means in a storage device; and apparatus-difference correction information providing means for reading from the storage device the apparatus-difference correction information stored in the storage device by the apparatus-difference correction information storing means, and for storing the apparatus-difference correction information in a database accessible by the mass-production managing computer, and wherein the mass-production managing computer comprises: quality/recipe information receiving means for receiving via the network the quality and recipe information sent by the quality/recipe information sending means; quality/recipe information storing means for storing the quality and recipe information received by the quality/recipe information receiving means in a storage device; recipe data sending means for reading from the storage device recipe data out of the recipe information stored in the storage device by the quality/recipe information storing means, and for sending the recipe data to the semiconductor manufacturing apparatus in the mass-production process; retrieval request data generating means for reading from the storage device the quality information stored in the storage device by the quality/recipe information storing means, and for comparing the quality information with a quality of the semiconductor device manufactured by the semiconductor manufacturing apparatus in the mass-production process, and for generating retrieval request data in the case where they are different; retrieval result data obtaining means for retrieving the apparatus-difference correction information stored in the database by using the retrieval request data generated by the retrieval request data generating means as a retrieval key, and for obtaining retrieval result data; recipe modifying means for modifying the recipe data based on the retrieval result data obtained by the retrieval result data obtaining means; and modified recipe sending means for sending the modified recipe data modified by the recipe modifying means to the semiconductor manufacturing apparatus in the mass-production process, and wherein the semiconductor manufacturing apparatus in the mass-production process comprises: modified recipe receiving means for receiving the modified recipe data sent by the modified recipe sending means; and recipe rewriting means for rewriting the recipe data of the semiconductor manufacturing apparatus by storing the modified recipe data received by the modified recipe receiving means in a storage device.

Other objects and further features of the present invention will be apparent from the following detailed description when read in conjunction with the accompanying drawings.

BRIEF DESCRIPTION OF THE DRAWINGS

FIG. 2 is a diagram showing quality information and recipe information to be transferred to a mass-production line;

FIG. 3 is a diagram showing apparatus-difference correction information to be transferred to the mass-production line;

FIG. 20 is a diagram showing apparatus-difference correction information registered in database according to an eighth embodiment of the present invention;

DETAILED DESCRIPTION OF THE PREFERRED EMBODIMENTS

Figure 1:
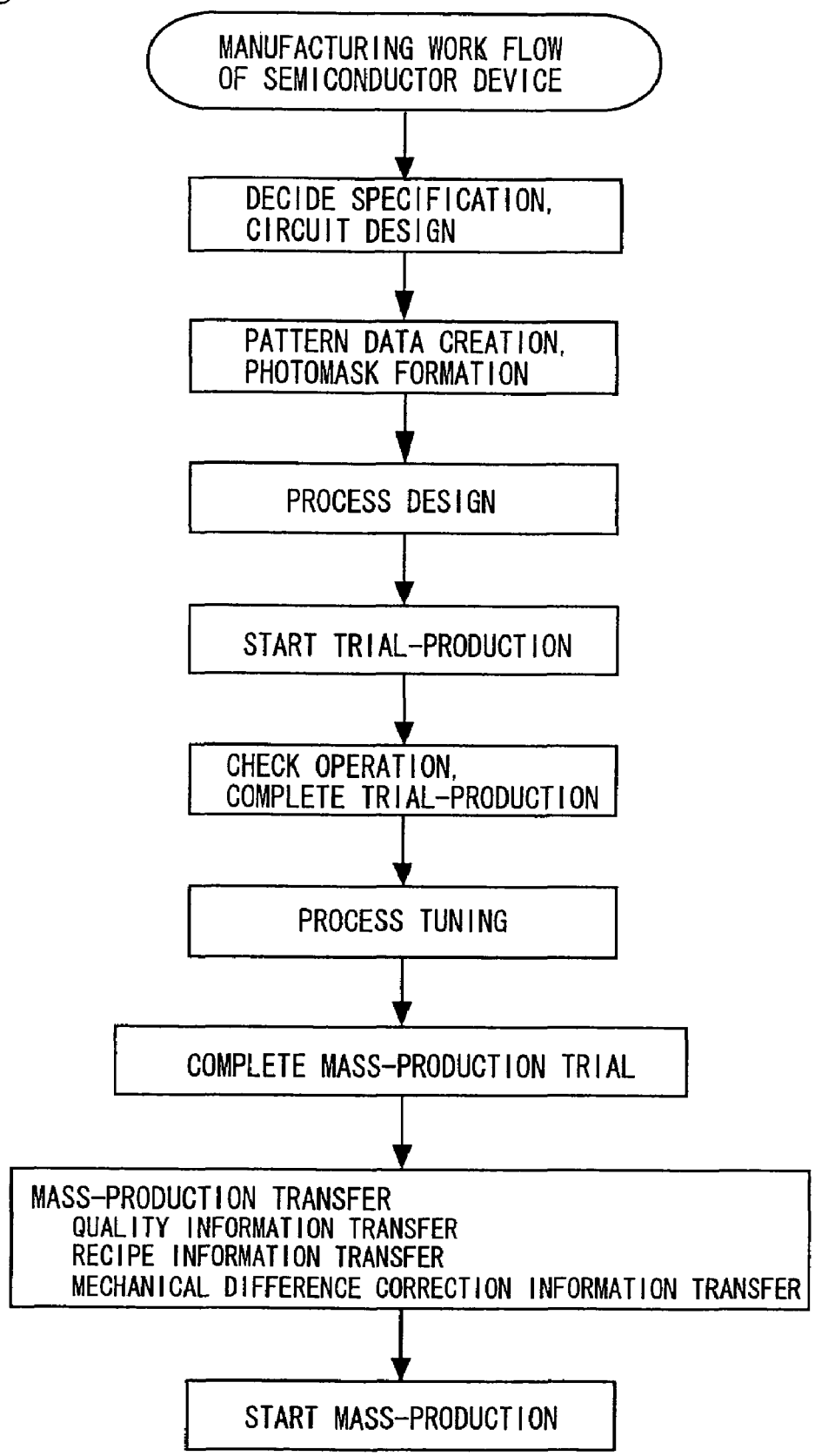
FIG. 1 is a diagram for describing a manufacturing workflow of a semiconductor device of a semiconductor device manufacturer according to a first embodiment of the present invention.

In the following, principles and embodiments of the present invention will be described with reference to the accompanying drawings. The members and steps that are common to some of the drawings are given the same reference numerals and redundant descriptions therefore may be omitted.

First Embodiment

First, a manufacturing workflow of a semiconductor device of a semiconductor device manufacturer will be described according to a first embodiment.

FIG. 1 is a diagram for describing the manufacturing workflow of the semiconductor device of the semiconductor device manufacturer according to the first embodiment.

As shown in FIG. 1, a specification of the semiconductor device is examined between a designer and a customer. Once the specification is decided, circuit design involving a circuit simulation is performed. If the circuit design is concluded, pattern data on layers is created. The created pattern data is sent to a mask design department in the semiconductor device manufacturer or a mask trader so as to be processed into mask data. Thereafter, a photomask is created by the mask trader based on the mask data. Process design using a process simulation is performed in parallel with creation of the photomask, and a trial-production primary specification plan is decided.

Detailed examination based on the trial-production primary specification plan is performed by a plurality of engineers including integration engineers (hereafter, referred to as an "I-Eng") in charge of design of modules such as a transistor and a capacitance and the entire product process having gathered the modules and element engineers (hereafter, referred to as an "E-Eng") engaged in a technical section such as lithography or dry etching accompanied by device operation.

To be more precise, the I-Eng creates a provisional flow after extracting differences from a base process, extracting differences from existing manufacturing specifications, deriving weak points, examining a PQC (process quality control) specification and performing wafer edge design. Furthermore, in cooperation with the E-Eng, the I-Eng examines a created provisional flow, examines a special specification and also examines risk distribution and PQC items and quantities. In a range of elemental technologies it is in charge of, the E-Eng extracts the differences from the base process and existing product specifications, and decides a processing apparatus (manufacturing apparatus) so as to engage in process development.

In this stage of the process development, the I-Eng and E-Eng perform optimization of process condition and obtains data thereon, and allocates process conditions to obtain process margin data.

If it reaches the stage capable of trial-production, the E-Eng creates a manufacturing specification document and a recipe for the manufacturing apparatus. After creating the recipe for the manufacturing apparatus, the trial-production of the semiconductor device is started.

In these stages of the process development to the trial-production, the I-Eng cooperates with the E-Eng to obtain PQC data, check a wafer appearance, check a wafer backside, check the weak points and check a wafer edge. In the same stages, the E-Eng develops and improves the elemental technologies, such as shape processing and CD (critical dimension), particles, static electricity, exfoliation, planarization, cleaning, materials and thermal budget. To be more specific, as to the specification being clarified, a trial-production now allowing evaluation as the semiconductor device is sent to the customer as required so as to perform an operation check on a customer system. If there is no problem in the operation check, the trial-production is completed after trial-production qualification. Thereafter, an adjustment to the process of which trial-production qualification is completed, that is, process tuning is performed from the viewpoint of improvement in yield and productivity. Reliability is evaluated, and if it reaches the stage where it is deliverable to the customer as a product, it is qualified as a commercial sample so as to complete mass-production trial.

Next, a mass-production transfer to a mass-production transfer is performed.

Here, to perform the mass-production transfer from a trial-production line to a mass-production line smoothly, the present invention transfers apparatus-difference correction information obtained in the development/trial-production stages (described later), in addition to the quality information and recipe information (described later). To be more specific, it transfers to a transfer destination the apparatus-difference correction information conventionally held unrecorded as know-how by the engineers engaged in the development/trial-production of a new product for correcting the differences in the qualities of the semiconductor devices due to apparatus-differences among the manufacturing apparatuses.

And the mass-production of the semiconductor device is started in the mass-production line after completing the mass-production transfer.

As described above, there are not only the cases where the mass-production transfer is performed from the trial-production line to the mass-production line, but also the cases where it is performed from one mass-production line (one mass-production plant) to another mass-production line (another mass-production plant) of a certain semiconductor device manufacturer. For instance, there is the case where a product receiving a lot of inquiries from the customers is produced at a plurality of mass-production plants. In this case, it is also necessary to complete lifetime production early before competitors join, where smooth mass-production transfer is desired and so the present invention is applicable.

As regards the semiconductor devices using a new-generation process from 90-nm node onward, there are the cases where, in order to improve investment efficiency, a plurality of semiconductor device manufacturers found a joint development company by gathering funds among themselves for the sake of engaging in development of a basic element process so as to bring back development results thereof to the semiconductor device manufacturers. To be more specific, there are the cases where the mass-production transfer is performed from the joint development company to the semiconductor device manufacturers who are consigners. In these cases, it is equivalent to a totally new line from the viewpoint of the new product or new process even though it is the mass-production for the semiconductor device manufacturers. Therefore, unlike a mass-production transfer operation within the same company, it is necessary to perform the above-mentioned manufacturing workflow from the beginning. Thus, it is necessary to increase efficiency of the operation in the manufacturing workflow.

Development of an extreme semiconductor device is often a result of combination of optimal conditions of the manufacturing apparatuses and process specifications. The inventors hereof noted that, from the viewpoint of the quality information on the trial-production, it is effective, though not conventionally performed, to reflect the following apparatus-difference correction information such as apparatus detail data comprehensively on manufacturing conditions.

FIG. 2 is a diagram showing the quality information and recipe information to be transferred to the mass-production line.

The quality information and recipe information shown in FIG. 2 are general information transferred on the mass-production transfer.

As shown in FIG. 2, the quality information includes the data on device characteristics, dimensions and film thickness. And the recipe information includes basic document data, which is the manufacturing specification, and the recipe for the manufacturing apparatus to be downloaded to the manufacturing apparatus in order to realize the manufacturing specification. The basic document data includes process specification data, layout rules, TEG (test element group) design data, PQC (process quality control) data for process management and history of change/modification data on layout/mask and so on.

FIG. 3 is a diagram showing the apparatus-difference correction information to be transferred to the mass-production line.

Here, the apparatus-difference correction information is detailed information generated or obtained by the mass-production transfer source in the development/trial-production stage, and is the information to be transferred from the transfer source to the transfer destination on the mass-production transfer according to the present invention. According to the present invention, the apparatus-difference correction information is the information for correcting the difference in the quality between the semiconductor device manufactured at the mass-production transfer source and that manufactured at the mass-production transfer destination associated with an "apparatus-difference" which may occur between the manufacturing apparatus at the mass-production transfer source and that at the mass-production transfer destination.

As shown in FIG. 3, the apparatus-difference correction information includes elemental technology data, newly developed contents related data, form fitting data, device characteristic fitting data, mask creation data and apparatus detail data.

According to the first embodiment, all the apparatus-difference correction information shown in FIG. 3 is transferred to the computer for managing a mass-production process. According to the second and third embodiments described later, however, only the apparatus-difference correction information which is retrieved is transferred on demand to the computer for managing the mass-production process.

The elemental technology data includes the process margin data obtained by changing the process conditions (gas flow rate, pressure, temperature, high-frequency power), data of optimization of process condition, shot matrix data (including a dummy shot) indicating chip placement positions, edge design data indicating use of wafer edge portion incapable of obtaining a chip and confirmation data thereof, and opening ratio data on the layers.

The newly developed contents related data includes the data indicating a background of a newly developed technology, the data indicating the contents adjusted on the development thereof, the data confirming the development results, the data on newly introduced equipment (for example, the manufacturing apparatus) and safety thereof, the data on newly introduced material, background until qualification of the introduction thereof and safety thereof, and sectional SEM photo data of a portion having a new device structure.

The form fitting data is the data related to the newly developed contents related data, and includes adjustment items decided to be necessary for form fitting and numerical targets thereof and the detailed data on the process developed to realize the numerical targets.

The device characteristic fitting data includes the data indicating the contents of adjustments made to a spacer form, a line width (including a gate length) and ion implantation conditions centering on surroundings of a gate electrode so that the characteristics, operation margin and reliability become demanded values as to the semiconductor devices (modules) such as transistors, capacitances and resistances.

The mask creation data includes the mask data created based on pattern data and the data on optical proximity effect required per stepper on creating the mask data.

As will be described in detail later, the apparatus detail data includes moment-to-moment change performance adjustment data, NPW (non-product wafer such as a dummy wafer) control data, chamber cleaning control data, device maintenance data, and process sensing technology data represented by a light emitting monitor technology.

As described above, such apparatus-difference correction information is generated or obtained by the engineers such as the I-Eng or E-Eng, and is inputted to a terminal and so on by the engineer so as to be registered in a database accessible by the computer of the mass-production transfer destination (described later). As will be described in detail in a fourth embodiment described later, the apparatus detail data can also be generated by exploiting EES. The engineer of the mass-production transfer destination can retrieve and obtain the apparatus-difference correction information registered in the database as required. The apparatus-difference correction information can be inputted not only after completion of the trial-production but also in the middle of the trial-production.

Such apparatus-difference correction information also includes non-successful cases and non-completed cases. Here, the non-successful cases and non-completed cases include evaluation result data of evaluation performed by targeting improvement, evaluation result data or experiment data not improved and not adopted, result data having failed due to a problematic evaluation method and so on in addition to the data included in a formal report. Thus, the engineer of the mass-production transfer destination can retrieve and obtain not only the successful cases and completed cases but also the non-successful cases and non-completed cases. Therefore, it is possible, when deriving a countermeasure at the mass-production transfer destination, to avoid wasting time by causing a defective event of the past to recur or repeatedly performing the same experiment so as to improve operational efficiency. This is especially suitable in the case of performing the mass-production transfer from the joint development company to the consignor (semiconductor device manufacturer).

Figure 4:
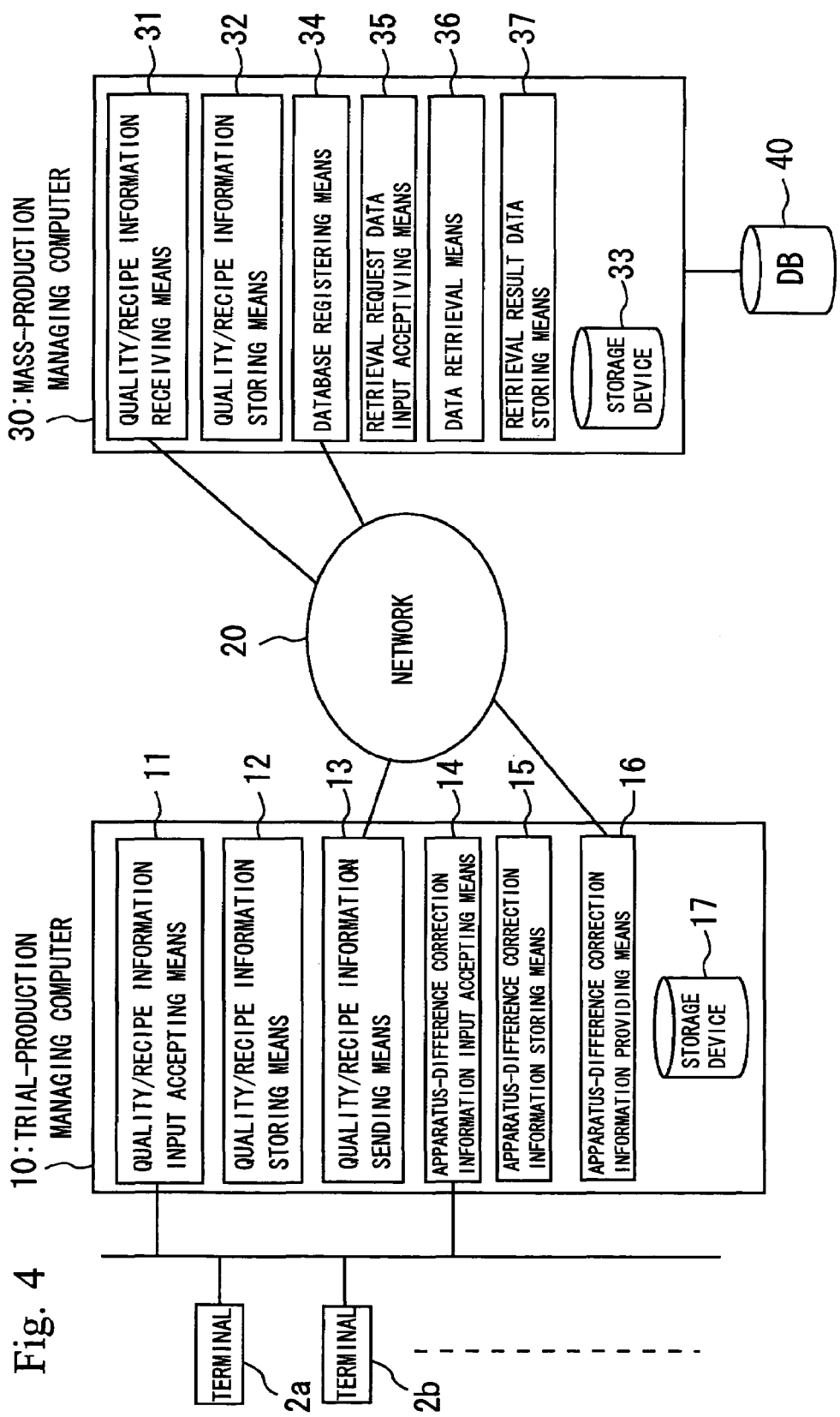
FIG. 4 is a block diagram for describing a mass-production transfer support system according to the first embodiment.

FIG. 4 is a block diagram for describing the mass-production transfer support system according to the first embodiment.

As shown in FIG. 4, a trial-production managing computer for managing the trial-production line as a mass-production transfer source managing computer 10 is connected via a network 20 to a mass-production managing computer for managing the mass-production line as a mass-production transfer destination managing computer 30. The mass-production managing computer 30 has a database 40 accessible by the mass-production managing computer 30 connected thereto. The database 40 has the apparatus-difference correction information shown in FIG. 3 registered therein. The apparatus-difference correction information is registered by a product name or by a wafer ID for instance. To be more specific, the apparatus-difference correction information registered in the database 40 is retrieved by using the product name or the wafer ID as a retrieval key. The network 20 can be either wired or wireless.

The trial-production managing computer 10 has a plurality of terminals 2a, 2b . . . connected thereto via a network. The terminals 2a, 2b . . . are intended to input the quality information, recipe information and apparatus-difference correction information to the trial-production managing computer 10.

The trial-production managing computer 10 comprises quality/recipe information input accepting means 11 for accepting an input of quality information and recipe information by the terminals 2a, 2b . . . , quality/recipe information storing means 12 for storing the accepted quality and recipe information in a storage device 17, and quality/recipe information sending means 13 for sending the quality and recipe information to the mass-production managing computer 30 via the network 20.

The trial-production managing computer 10 further comprises apparatus-difference correction information input accepting means 14 for accepting the input of the apparatus-difference correction information by the terminals 2a, 2b . . . , apparatus-difference correction information storing means 15 for storing the accepted apparatus-difference correction information in the storage device 17, and apparatus-difference correction information providing means 16 for reading from the storage device 17 the stored apparatus-difference correction information and storing it in the database 40. That is, the apparatus-difference correction information providing means 16 sends the apparatus-difference correction information to the mass-production managing computer 30 via the network 20.

The storage device 17 may be provided outside the trial-production managing computer 10. The trial-production managing computer 10 may comprise a plurality of the storage devices 17, and have the quality information, recipe information and apparatus-difference correction information stored in the storage devices respectively.

The mass-production managing computer 30 comprises quality/recipe information receiving means 31 for receiving the quality information and recipe information via the network 20 and quality/recipe information storing means 32 for storing the received quality information and recipe information in a storage device 33.

The mass-production managing computer 30 further comprises database registering means 34 for receiving the apparatus-difference correction information via the network 20 and for registering the received apparatus-difference correction information in the database 40, retrieval request data input accepting means 35 for accepting an input of the retrieval request data such as the product name or wafer ID, and data retrieval means 36 for, in accepting the input of the retrieval request data, retrieving the apparatus-difference correction information registered in the database 40 by using the accepted retrieval request data as the retrieval key and for outputting the apparatus-difference correction information as the retrieval result, and retrieval result data storing means 37 for storing the retrieval result in the storage device 33.

Next, the operation of the mass-production transfer support system, and in particular, the mass-production transfer using the mass-production transfer support system will be described in detail.

First, the transfer of the quality information and recipe information will be described.

After completing the trial-production, if the quality information and recipe information are inputted to the terminals 2a, 2b . . . by the engineers (I-Eng, E-Eng) engaged in the development and trial-production of the new product, the inputted quality information and recipe information are accepted by the quality/recipe information input accepting means 11 of the trial-production managing computer 10. The accepted quality information and recipe information are stored in the storage device 17 by the quality/recipe information storing means 12. The stored quality information and recipe information are read from the storage device 33 by the quality/recipe information sending means 13, and are sent to the mass-production managing computer 30 via the network 20. The quality information and recipe information sent by the quality/recipe information sending means 13 of the trial-production managing computer 10 are received by the quality/recipe information receiving means 31 of the mass-production managing computer 30 via the network 20. The received quality information and recipe information are stored in the storage device 33 by the quality and recipe information storing means 32 and are outputted. Of the outputted recipe information,, recipe data for the manufacturing apparatus (hereafter, referred to as the "recipe data") has its format converted as required, and then is downloaded to the manufacturing apparatus of the mass-production line. The quality information and recipe information are thereby transferred to the mass-production line.

Next, the transfer of the apparatus-difference correction information will be described.

After completing the trial-production or in the middle of the trial-production, if the apparatus-difference correction information is inputted to the terminals 2a, 2b . . . together with the product name or wafer ID by the engineers (I-Eng, E-Eng), the inputted apparatus-difference correction information is accepted by the apparatus-difference correction information input accepting means 14 of the trial-production managing computer 10. The accepted apparatus-difference correction information is stored in the storage device 17 by the apparatus-difference correction information storing means 15. The stored apparatus-difference correction information is read from the storage device 17 by the apparatus-difference correction information providing means 16, and the read apparatus-difference correction information is sent to the mass-production managing computer 30 via the network 20 by the means 16. The sent apparatus-difference correction information is received by the database registering means 34 of the mass-production managing computer 30 via the network 20,-and the received apparatus-difference correction information is registered in the database 40 by the product name or wafer ID by the database registering means 34. The apparatus-difference correction information is thereby transferred to the mass-production line.

In the case where the quality of the semiconductor device manufactured by the mass-production line is different from the trial-production due to existence of the apparatus-difference, that is in the case where the quality of the manufactured semiconductor device is different from the quality information, any retrieval request data such as the product name or wafer ID inputted then to the terminal (not shown) connected to the mass-production managing computer 30 by the engineer of the mass-production line is accepted by the retrieval request data input accepting means 35 of the mass-production managing computer 30. The apparatus-difference correction information registered in the database 40 is retrieved by the data retrieval means 36 by using the accepted retrieval request data (that is, the product name or wafer ID) as the retrieval key. The apparatus-difference correction information as the retrieval result data is outputted, and the retrieval result data is stored in the storage device 33 by the retrieval result data storing means 37.

Thereafter, the engineer of the mass-production line selects necessary apparatus-difference correction information out of the outputted apparatus-difference correction information, modifies the recipe data for the manufacturing apparatus based on the selected apparatus-difference correction information, and downloads the modified recipe data to the manufacturing apparatus. Or else, the engineer of the mass-production line changes a parameter (also referred to as a "constant") set in the manufacturing apparatus based on the selected apparatus-difference correction information. Thus, the apparatus-difference existing between the manufacturing apparatuses of the trial-production line and the mass-production line is corrected by modifying the recipe data or changing the apparatus parameter based on the apparatus-difference correction information. If the quality of the semiconductor device manufactured in the mass-production line can thereby be conformed to that of the trial-production, the mass-production transfer is completed.

The engineer of the mass-production line may request an additional trial-production as required (same in the embodiments described later).

To be more precise, although not shown, the mass-production managing computer 30 may further comprise additional trial-production request data input accepting means for accepting an input of additional trial-production request data and additional trial-production request data sending means for sending the accepted additional trial-production request data to the trial-production managing computer 10 via the network 20, and the trial-production managing computer 10 may further comprise additional trial-production request data receiving means for receiving and outputting the sent additional trial-production request data.

And if the additional trial-production request data is inputted to the terminal (not shown) by the engineer of the mass-production line, the inputted additional trial-production request data is accepted by the additional trial-production request data input accepting means, and the accepted additional trial-production request data is sent via the network 20 to the trial-production managing computer 10 by the additional trial-production request data sending means. The sent additional trial-production request data is received and outputted by the additional trial-production request data receiving means. Thereafter, additional trial-production of the semiconductor device is performed by the engineer engaged in the trial-production based on the outputted additional trial-production request data. The quality information, recipe information and apparatus-difference correction information accompanying the additional trial-production are inputted to the terminal 2a by the engineer engaged in the additional trial-production to be transferred to the mass-production managing computer 30 as described above.

As described above, according to the first embodiment, the apparatus-difference correction information generated or obtained in the trial-production stage is transferred together with the quality information and recipe information on performing the mass-production transfer from the trial-production line to the mass-production line. Thus, the engineer of the mass-production line can retrieve and obtain the apparatus-difference correction information registered in the database 40 and necessary to realize the quality equivalent to the protptype by using the mass-production managing computer 30. Therefore, it is possible, even though a problem accompanying the apparatus-difference among the manufacturing apparatuses certainly arises, to have the mass-production transfer smoothly performed by the engineer of the mass-production line without dispatching to the mass-production transfer destination the engineers having engaged in development and trial-production of the new product when the problem arises.

It is also possible to consult with the engineer of the mass-production line by interactively providing the apparatus-difference correction information. Thus, an inquiry from the engineer of the mass-production line to the engineers having engaged in development and trial-production is no longer necessary.

The first embodiment described the case of performing the mass-production transfer from the trial-production line to the mass-production line. As described above, however, it is also possible to apply the first embodiment to the case of performing the mass-production transfer from one mass-production line (one mass-production plant) to another mass-production line (another mass-production plant) of a certain semiconductor device manufacturer (same in the embodiments described later).

The first embodiment is also applicable to the case of performing the mass-production transfer from the joint development company to the semiconductor device manufacturers who are consigners (same in the embodiments described later).

As all development information including the non-successful cases and non-completed cases is transferred as the apparatus-difference correction information to the semiconductor device manufacturers, it is possible for the semiconductor device manufacturers to prevent recurrence of the defective event of the past and repetition of the same experiment which are apt to occur on development of new technologies and new products so as to avoid wasting time. The non-successful cases and non-completed cases are conventionally implicit knowledge which often disappears without technical transfer. However, this problem will be solved by the present invention.

As the elemental technology data is transferred as the apparatus-difference correction information to the semiconductor device manufacturers, the semiconductor device manufacturers can grasp a steady state of the products and processes, and reduce analysis man-hours on occurrence of problems.

As the apparatus detail data including operational details is transferred as the apparatus-difference correction information to the semiconductor device manufacturers, it is possible to reproduce the quality of the semiconductor device using the apparatus detail data. Thus, it is possible to reproduce the quality of the semiconductor device with high accuracy.

Next, a first transformed example of the first embodiment will be described.

The above-mentioned first embodiment described the cases of performing the mass-production transfer after completing mass-production trial. In recent years, there is a trend that product life of the semiconductor device is further reduced, and so it is demanded to reduce total hours required for the development, trial-production and mass-production transfer of the semiconductor device. Thus, to meet this demand, the first transformed example will describe an example wherein the mass-production transfer support system according to the first embodiment is used to perform the mass-production trial in the trial-production line while reproducibility thereof is sequentially checked in the mass-production line.

During the mass-production trial, the quality information and recipe information in the middle of the trial-production are sequentially inputted to the terminals 2a, 2b . . . by the engineers. Furthermore, the apparatus-difference correction information generated or obtained during the mass-production trial is sequentially inputted to the terminals 2a, 2b . . . together with the product name or wafer ID by the engineers.

As described above, the inputted quality information and recipe information in the middle of the trial-production are accepted by the trial-production managing computer 10, and are sent to the mass-production managing computer 30 via the network 20. The sent quality information and recipe information are received by the mass-production managing computer 30, and are outputted.

Of the outputted recipe information, the recipe data for the manufacturing apparatus has its format converted as required, and then is downloaded to the manufacturing apparatus of the mass-production line. And a check is made in the mass-production line as to the reproducibility of the mass-production trial in the trial-production line, that is, the differences between the quality of the semiconductor device manufactured in the mass-production line and the quality information in the middle of the trial-production in the trial-production line.

The inputted apparatus-difference correction information is accepted by the trial-production managing computer 10, and is sent to the mass-production managing computer 30 via the network 20. The sent apparatus-difference correction information is received by the mass-production managing computer 30, and is registered in the database 40 by the product name or wafer ID.

In the case where the reproducibility of the mass-production trial (that is, the reproducibility of the quality in the middle of the trial-production) cannot be obtained in the mass-production line, the retrieval request data such as the product name or wafer ID inputted then to the terminal by the engineer of the mass-production line is accepted by the mass-production managing computer 30 as described above. The apparatus-difference correction information registered in the database 40 is retrieved by using the accepted retrieval request data as the retrieval key, and the apparatus-difference correction information is outputted as the retrieval result.

Thereafter, the engineer of the mass-production line modifies the recipe data for the manufacturing apparatus based on the outputted apparatus-difference correction information, and downloads the modified recipe data to the manufacturing apparatus. Or else, the engineer of the mass-production line changes the parameter set in the manufacturing apparatus based on the outputted apparatus-difference correction information. Thus, the apparatus-difference existing between the manufacturing apparatuses of the trial-production line and the mass-production line is corrected by modifying the recipe data or changing the parameter based on the apparatus-difference correction information. It is thereby possible to obtain the reproducibility of the mass-production trial in the mass-production line.

As described above, the first transformed example performs the mass-production trial in the trial-production line and the mass-production transfer (reproducibility check) in the mass-production line in parallel with a little time lag. Therefore, it is possible to reduce the total time required for the development, trial-production and mass-production transfer of the semiconductor device compared to the case of performing the mass-production transfer after completing the mass-production trial as in the first embodiment.

Next, a second transformed example of the first embodiment will be described.

According to the second transformed example, in the case where good results are obtained by the engineer of the mass-production line on checking the reproducibility of the mass-production trial as with the first transformed example, the apparatus-difference correction information inputted by the engineer is registered in the database 40 so that the registered apparatus-difference correction information can be retrieved and obtained by the trial-production managing computer 10. Hereafter, a description will be given by centering on the portion different from the first embodiment.

Figure 5:
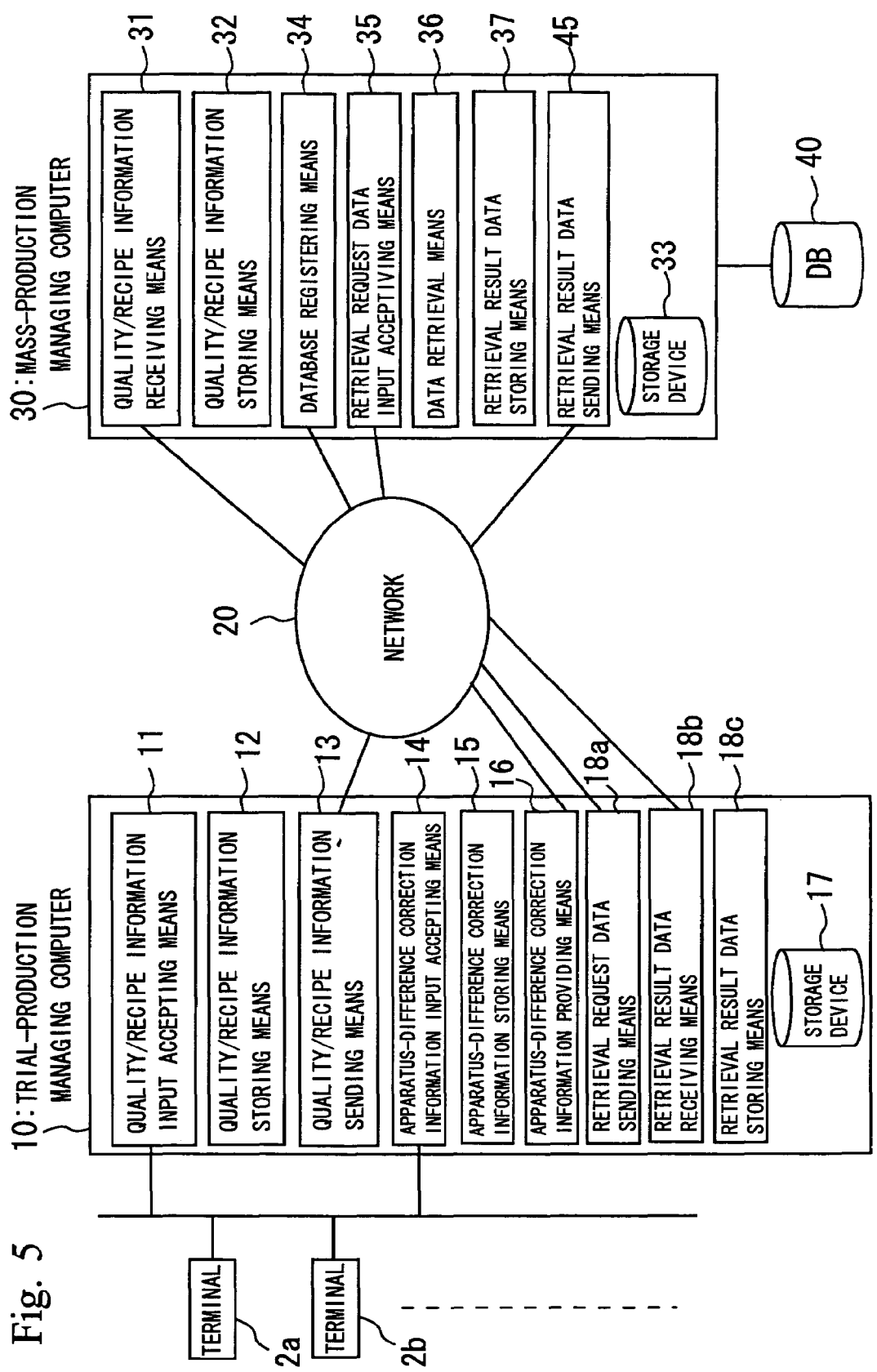
FIG. 5 is a block diagram for describing a second transformed example of the first embodiment of the present invention.

FIG. 5 is a block diagram for describing the second transformed example of the first embodiment of the present invention.

As shown in FIG. 5, the database registering means 34 of the mass-production managing computer 30 accepts the apparatus-difference correction information, and registers the accepted apparatus-difference correction information in the database 40. And the mass-production managing computer 30 further comprises retrieval result data sending means 45 for reading retrieval result data stored in the storage device 33 and sending the read apparatus-difference correction information as the retrieval result data to the trial-production managing computer 10 via the network 20. The trial-production managing computer 10 further comprises retrieval request data sending means 18a for sending retrieval request data inputted by the terminals 2a, 2b . . . to the mass-production managing computer 30 via the network 20, retrieval result data receiving means 18b for receiving the retrieval result data, and retrieval result data storing means 18c for storing the received retrieval result data in the storage device 17.

If the apparatus-difference correction information obtained or generated by the engineer of the mass-production line is inputted to the terminal together with the product name or the wafer ID, the inputted apparatus-difference correction information is accepted by the database registering means 34 and is registered in the database 40.

If the retrieval request data such as the product name or the wafer ID is inputted to the terminals 2a, 2b . . . by the engineer of the trial-production/development line, the inputted retrieval request data is sent via the network 20 to the mass-production managing computer 30 by the retrieval request data sending means 18a of the trial-production managing computer 10. The sent retrieval request data is accepted by the retrieval request data input accepting means 35. The apparatus-difference correction information registered in the database 40 is retrieved by the data retrieval means 36 by using the accepted retrieval request data as the retrieval key. The retrieval result data is stored in the storage device 33 by the retrieval result data storing means 37. The stored retrieval result data is read from the storage device 33 by the retrieval result data sending means 45, and the read retrieval result data is sent to the trial-production managing computer 10 via the network 20. The sent retrieval result data is received by the retrieval result data receiving means 18b so as to be outputted. The received retrieval result data is stored in the storage device 17 by the retrieval request data storing means 18c.

According to the second transformed example, the apparatus-difference correction information obtained in the mass-production line is registered in the database 40 so that it can be retrieved and obtained by the trial-production managing computer 10. Thus, the development can be performed both in the trial-production line and the mass-production line in parallel. Therefore, it is possible to further reduce the total time required for the development, trial-production and mass-production transfer of the semiconductor device.

Next, a third transformed example of the first embodiment will be described.

According to the above-mentioned first embodiment and first and second transformed examples, all of the apparatus-difference correction information inputted by the terminal 2a of the trial-production line and stored in the storage device 17 is transferred to the mass-production line. To be more specific, all of the apparatus-difference correction information stored in the storage device 17 is registered in the database 40. If the apparatus-difference correction information is an enormous amount, however, there are the cases where only a part of the apparatus-difference correction information is transferred to the mass-production line instead of transferring all of it. In these cases, there is a possibility that there is no information desired by the engineer of the mass-production line in the apparatus-difference correction information registered in the database 40.

Even if all of the apparatus-difference correction information stored in the storage device 17 is transferred to the mass-production line (registered in the database 40), there is a possibility that there is no information desired by the engineer of the mass-production line in the apparatus-difference correction information registered in the database 40 as in the case of transferring only a part.

According to the third transformed example, the apparatus-difference correction information different from that transferred (hereafter, referred to as "short apparatus-difference, correction information") can be demanded and obtained from the mass-production line to the trial-production line. As a concrete case, it is assumed that, in the process of performing hydrofluoric acid cleaning and then pure water cleaning to a process kit (focus ring for instance) taken out of a chamber and further drying it in a bake furnace, the apparatus-difference correction information such as cleaning time, drying time and temperature in the bake furnace is transferred to the mass-production line. In the mass-production line, however, the process kit is laid down to be dried in the bake furnace so that there are the cases where a watermark (trace of drying) remains on the process kit and exerts a harmful influence on the product. In the case where there is no information on how to place the process kit in the bake furnace (in the trial-production line, the process kit is placed upright to be dried) in the apparatus-difference correction information registered in the database, it is possible to request the short apparatus-difference correction information from the mass-production line to the trial-production line. If it is not stored in the storage device 17 of the trial-production managing computer 10, the engineer of the trial-production line should input it to the terminal 2.

Figure 6:
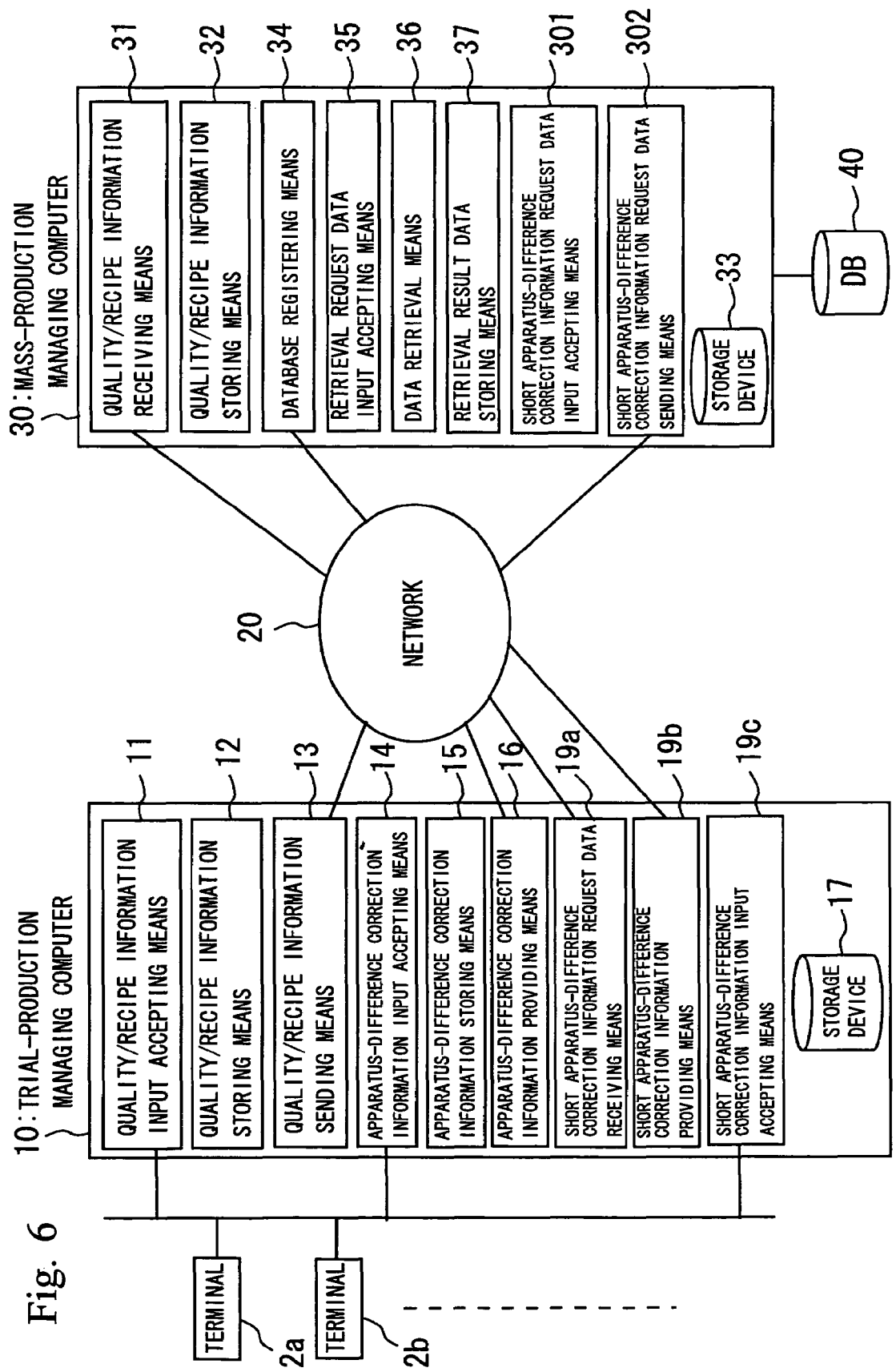
FIG. 6 is a block diagram for describing a third transformed example of the first embodiment of the present invention.

FIG. 6 is a block diagram for describing the third transformed example of the first embodiment of the present invention.

As shown in FIG. 6, in the case where the engineer of the mass-production line determines that the desired apparatus-difference correction information does not exist in the database 40, short apparatus-difference correction information request data for requesting the short apparatus-difference correction information (hereafter, referred to as the "request data") is inputted to the terminal. The inputted request data is accepted by short apparatus-difference correction information request data input accepting means 301 of the mass-production managing computer 30. The accepted request data is sent via the network 20 to the trial-production managing computer 10 by short apparatus-difference correction information request data sending means 302. The sent request data is received by short apparatus-difference correction information request data receiving means 19a of the trial-production managing computer 10. Short apparatus-difference correction information providing means 19b retrieves the apparatus-difference correction information stored in the storage device 17 by using the received request data as the retrieval key, and sends the short apparatus-difference correction information obtained by the retrieval to the mass-production managing computer 30 via the network 20. The sent short apparatus-difference correction information is received by the database registering means 34 of the mass-production managing computer 30 to be registered in the database 40. Thus, the engineer of the mass-production line can obtain the short apparatus-difference correction information.

There are also the cases where the short apparatus-difference correction information is not stored in the storage device 17. In these cases, it is indicated on a display device (not shown) that the short apparatus-difference correction information is requested so as to prompt the engineer of the trial-production line to input it. If the short apparatus-difference correction information is inputted to the terminals 2a, 2b . . . by the engineer of the trial-production line, the inputted short apparatus-difference correction information is accepted by short apparatus-difference correction information input accepting means 19c. The accepted short apparatus-difference correction information is sent to the mass-production managing computer 30 by the short apparatus-difference correction information providing means 19b.

Second Embodiment

Figure 7:
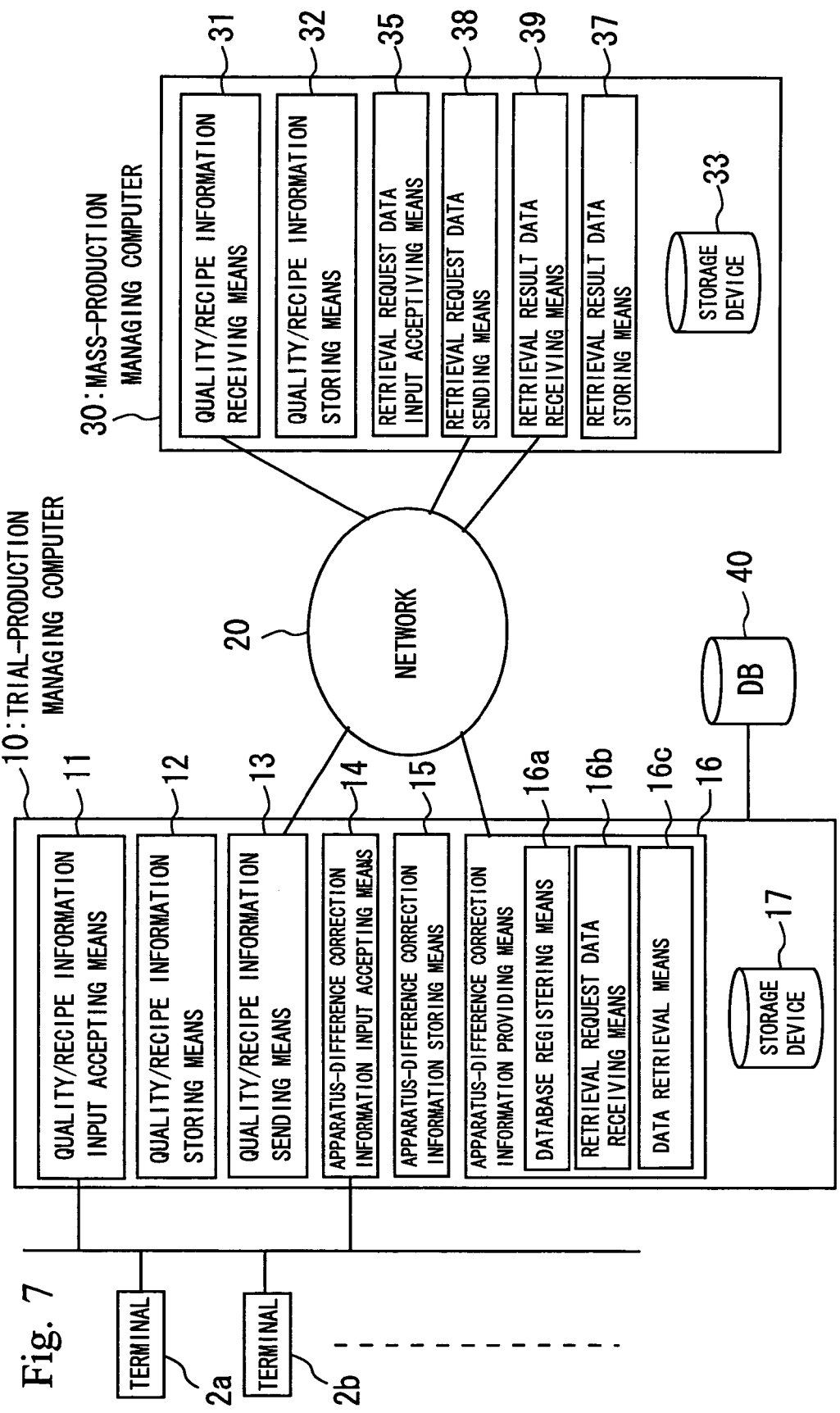
FIG. 7 is a block diagram for describing a mass-production transfer support system according to a second embodiment of the present invention.

FIG. 7 is a block diagram for describing the mass-production transfer support system according to a second embodiment of the present invention.

As shown in FIG. 7, the database 40 in which the apparatus-difference correction information is accumulated is not connected to the mass-production managing computer 30 as in the first embodiment but is connected to the trial-production managing computer 10. The mass-production managing computer 30 can access the database 40 via the network 20. According to the second embodiment, necessary apparatus-difference correction information is transferred on demand. Hereafter, a description will be given by centering on the portion different from the first embodiment.

In the trial-production managing computer 10 for managing the trial-production line which is the mass-production transfer source, the apparatus-difference correction information providing means 16 comprises database registering means 16a for reading from the storage device 17 the apparatus-difference correction information stored in the storage device 17 by the apparatus-difference correction information storing means 15 and registering the read apparatus-difference correction information in the database 40 by the product name or wafer ID, retrieval request data receiving means 16b for receiving the retrieval request data such as the product name or wafer ID via the network 20, and data retrieval means 16c for, in receiving the retrieval request data by retrieval request data receiving means 16b, retrieving the apparatus-difference correction information registered in the database 40 by using the received retrieval request data as the retrieval key and sending the apparatus-difference correction information as the retrieval result to the mass-production managing computer 30 via the network 20.

The mass-production managing computer 30 for managing the mass-production line which is the mass-production transfer destination comprises retrieval request data sending means 38 for, in accepting the input of the retrieval request data such as the product name or wafer ID by the retrieval request data input accepting means 35, sending the accepted retrieval request data to the trial-production managing computer 10 via the network 20 and retrieval result data receiving means 39 for receiving and outputting the apparatus-difference correction information as the retrieval result via the network 20. The retrieval result data storing means 37 of the mass-production managing computer 30 stores the apparatus-difference correction information as the retrieval result received by the retrieval result data receiving means 39 in the storage device 33.

Next, the mass-production transfer using the mass-production transfer support system will be described.

The transfer of the quality information and recipe information is the same as that in the first embodiment, and so a description thereof will be omitted.

Hereafter, the transfer of the apparatus-difference correction information on demand will be described.

After completing the trial-production or in the middle of the trial-production, if the apparatus-difference correction information is inputted to the terminals 2a, 2b . . . together with the product name or wafer ID by the engineers (I-Eng, E-Eng), the inputted apparatus-difference correction information is accepted by the apparatus-difference correction information input accepting means 14 of the trial-production managing computer 10. The accepted apparatus-difference correction information is stored in the storage device 17 by the apparatus-difference correction information storing means 15. The stored apparatus-difference correction information is read from the storage device 17 by the database registering means 16a of the apparatus-difference correction information providing means 16, and the read apparatus-difference correction information is registered in the database 40 by the product name or wafer ID.

In the case where the quality of the semiconductor device is different from that of the trial-production due to existence of-the apparatus-difference on the mass-production transfer, any retrieval request data such as the product name or wafer ID inputted then to the terminal (not shown) connected to the mass-production managing computer 30 by the engineer of the mass-production line is accepted by the retrieval request data input accepting means 35 of the mass-production managing computer 30. The accepted retrieval request data is sent to the trial-production managing computer 10 via the network 20 by the retrieval request data sending means 38. If the sent retrieval request data is received by the retrieval request data receiving means 16b of the trial-production managing computer 10 via the network 20, the apparatus-difference correction information registered in the database 40 is retrieved by the data retrieval means 16c by using the received retrieval request data as the retrieval key, and the apparatus-difference correction information as the retrieval result is sent to the mass-production managing computer 30 via the network 20 by the data retrieval means 16c. The sent apparatus-difference correction information as the retrieval result data is received and outputted via the network 20 by retrieval result data receiving means 39 of the mass-production managing computer 30, and the received apparatus-difference correction information is stored in the storage device 33 by the retrieval result data storing means 37. Thus, the apparatus-difference correction information is transferred to the mass-production line on demand.

Thereafter, the engineer of the mass-production line modifies the recipe data for the manufacturing apparatus based on the outputted apparatus-difference correction information, and downloads the modified recipe data to the manufacturing apparatus. Or else, the engineer of the mass-production line changes the parameter set in the manufacturing apparatus based on the outputted apparatus-difference correction information. Thus, the apparatus-difference existing between the manufacturing apparatuses of the trial-production line and the mass-production line is corrected by modifying the recipe data or changing the apparatus parameter based on the apparatus-difference correction information. It is thereby possible to conform the quality of the semiconductor device manufactured in the mass-production line to that of the trial-production so as to complete the mass-production transfer.

As described above, in the mass-production transfer from the trial-production line to the mass-production line according to the second embodiment, the quality information and recipe information are transferred and the apparatus-difference correction information generated or obtained in the trial-production stage is transferred on demand. Thus, the engineer of the mass-production line can retrieve and obtain the apparatus-difference correction information registered in the database 40 and necessary to realize the quality equivalent to the trial-production by using the mass-production managing computer 30. Therefore, it is possible to have the mass-production transfer smoothly performed by the engineer of the mass-production line without dispatching to the mass-production transfer destination the engineers having engaged in the development and trial-production of the new product.

Next, the first transformed example of the second embodiment will be described.

As described as to the first transformed example of the first embodiment, it is demanded to reduce total hours required for the development, trial-production and mass-production transfer of the semiconductor device. Thus, to meet this demand, the first transformed example will describe a form wherein the mass-production transfer support system according to the second embodiment is used to perform the mass-production trial in the trial-production line while reproducibility thereof is sequentially checked in the mass-production line.

During the mass-production trial, the quality information and recipe information in the middle of the trial-production are sequentially inputted to the terminals 2a, 2b . . . by the engineers. Furthermore, the apparatus-difference correction information obtained during the mass-production trial is sequentially inputted to the terminals 2a, 2b . . . together with the product name or wafer ID by the engineers.

As described above, the inputted quality information and recipe information are accepted by the trial-production managing computer 10, and are sent to the mass-production managing computer 30 via the network 20. The sent quality information and recipe information are received by the mass-production managing computer 30, and the received quality information and recipe information are outputted and stored.

The recipe data for the manufacturing apparatus as the outputted recipe information has its format converted as required, and then is downloaded to the manufacturing apparatus of the mass-production line. And a check is made in the mass-production line as to the reproducibility of the mass-production trial in the trial-production line.

The inputted apparatus-difference correction information is accepted by the trial-production managing computer 10, and is registered in the database 40 by the product name or wafer ID.

In the case where the reproducibility of the mass-production trial (that is, the reproducibility of the quality in the middle of the trial-production) cannot be obtained in the mass-production line, any retrieval request data such as the product name or wafer ID inputted to the terminal by the engineer of the mass-production line is accepted by the mass-production managing computer 30 as described above, and is sent to the trial-production managing computer 10 via the network 20. The sent retrieval request data is received by the trial-production managing computer 10, the apparatus-difference correction information registered in the database 40 is retrieved by using the received retrieval request data as the retrieval key, and the apparatus-difference correction information as the retrieval result data is sent to the mass-production managing computer 30 via the network 20. The sent apparatus-difference correction information is received and outputted by the mass-production managing computer 30.

Thereafter, the engineer of the mass-production line modifies the recipe data for the manufacturing apparatus based on the outputted apparatus-difference correction information, and downloads the modified recipe data to the manufacturing apparatus. Or else, the engineer of the mass-production line changes the parameter set in the manufacturing apparatus based on the outputted apparatus-difference correction information. Thus, the apparatus-difference existing between the manufacturing apparatuses of the trial-production line and the mass-production line is corrected by modifying the recipe data or changing the parameter based on the apparatus-difference correction information. It is thereby possible to obtain the reproducibility of the mass-production trial in the mass-production line.

As described above, the first transformed example performs the mass-production trial in the trial-production line and the mass-production transfer (reproducibility check) in the mass-production line in parallel with a little time lag. Therefore, it is possible to reduce the total time required for the development, trial-production and mass-production transfer of the semiconductor device compared to the case of performing the mass-production transfer after completing the mass-production trial as in the second embodiment.

Next, the second transformed example of the second embodiment will be described.

According to the second transformed example, in the case where good results are obtained by the engineer of the mass-production line on checking the reproducibility of the mass-production trial like the first transformed example as with the second transformed example of the first embodiment, the apparatus-difference correction information inputted by the engineer is registered in the database 40 so that the registered apparatus-difference correction information can be retrieved and obtained by the trial-production managing computer 10. Hereafter, a description will be given by centering on the portion different from the second embodiment.

Figure 8:
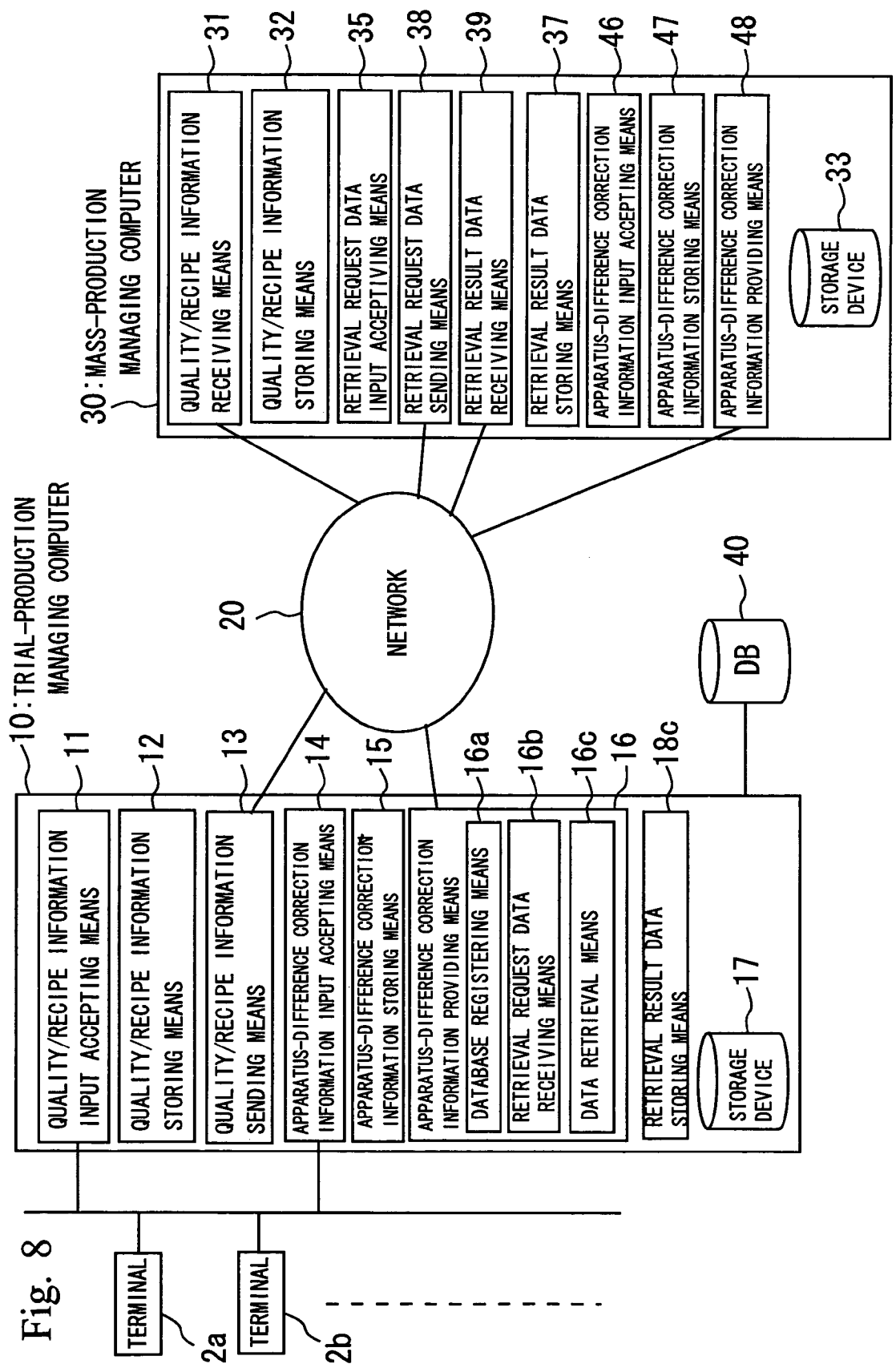
FIG. 8 is a block diagram for describing a second transformed example of the second embodiment of the present invention.

FIG. 8 is a block diagram for describing the second transformed example of the second embodiment of the present invention.

As shown in FIG. 8, the mass-production managing computer 30 further comprises apparatus-difference correction information input accepting means 46 for accepting an input of apparatus-difference correction information, apparatus-difference correction information storing means 47 for storing the accepted apparatus-difference correction information in the storage device 33, and apparatus-difference correction information providing means 48 for reading the stored apparatus-difference correction information from the storage device 33 and sending the read apparatus-difference correction information to the trial-production managing computer 10 via the network 20. The database registering means 16a of the trial-production managing computer 10 receives the apparatus-difference correction information via the network 20, and registers the received apparatus-difference correction information in the database 40. The trial-production managing computer 10 further comprises the retrieval result data storing means 18a for storing the apparatus-difference correction information as the retrieval result data by the data retrieval means 16c in the storage device 17 and outputting it.

If the apparatus-difference correction information obtained or generated by the engineer of the mass-production line is inputted to the terminal together with the product name or the wafer ID, the inputted apparatus-difference correction information is accepted by the apparatus-difference correction information input accepting means 46, and the accepted apparatus-difference correction information is stored in the storage device 33 by the apparatus-difference correction information storing means 47. The stored apparatus-difference correction information is read by the apparatus-difference correction information providing means 48, and the read apparatus-difference correction information is sent to the trial-production managing computer 10 via the network 20. The sent apparatus-difference correction information is received by the database registering means 16a, and the received apparatus-difference correction information is registered in the database 40 by the product name or wafer ID by the database registering means 16a.

If the retrieval request data such as the product name or the wafer ID is inputted to the terminals 2a, 2b . . . by the engineer of the trial-production/development line, the inputted retrieval request data is accepted by the retrieval request data input accepting means 16b. The apparatus-difference correction information registered in the database 40 is retrieved by the data retrieval means 16c by using the accepted retrieval request data as the retrieval key. The retrieval result data is stored in the storage device 17 by the retrieval result data storing means 18a, and the retrieval result data is outputted.

According to the second transformed example, the apparatus-difference correction information obtained in the mass-production line is registered in the database 40 so that it can be retrieved and obtained by the trial-production managing computer 10. Thus, the development can be performed both in the trial-production line and mass-production line in parallel. Therefore, it is possible to further reduce the total time required for the development, trial-production and mass-production transfer of the semiconductor device.

Next, the third transformed example of the second embodiment will be described.

The third transformed example allows the short apparatus-difference correction information to be requested and obtained from the mass-production line to the trial-production line as with the third transformed example of the above-mentioned first embodiment.

Figure 9:
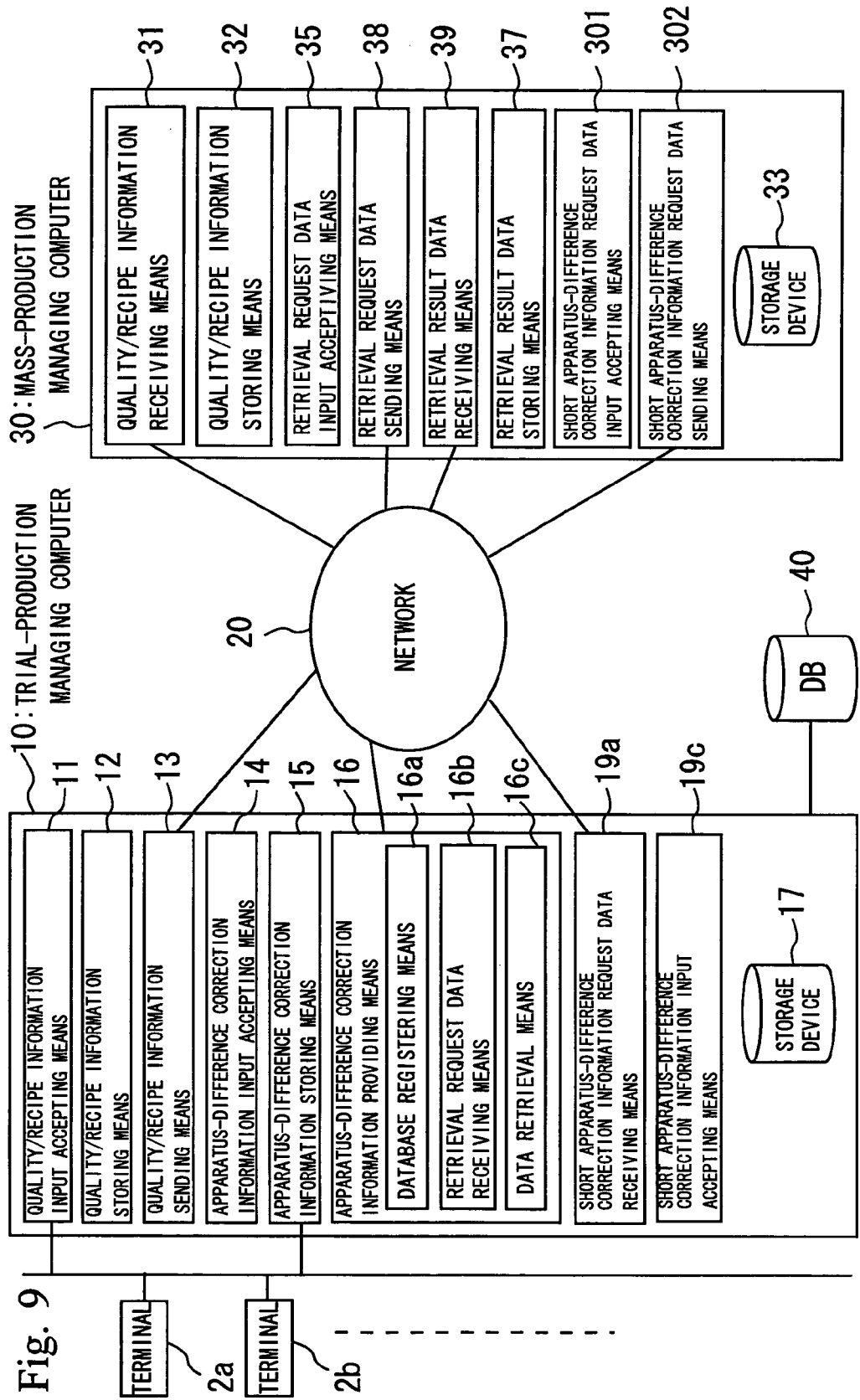
FIG. 9 is a block diagram for describing a third transformed example of the second embodiment of the present invention.

FIG. 9 is a block diagram for describing the third transformed example of the second embodiment of the present invention.

As shown in FIG. 9, in the case where the engineer of the mass-production line determines that the desired apparatus-difference correction information does not exist in the database 40, short apparatus-difference correction information request data for requesting the short apparatus-difference correction information (hereafter, referred to as the "request data") is inputted to the terminal. The inputted request data is accepted by short apparatus-difference correction information request data input accepting means 301 of the mass-production managing computer 30. The accepted request data is sent via the network 20 to the trial-production managing computer 10 by short apparatus-difference correction information request data sending means 302. The sent request data is received by short apparatus-difference correction information request data receiving means 19a of the trial-production managing computer 10. The database registering means 16a of the trial-production managing computer 10 retrieves the apparatus-difference correction information stored in the storage device 17 by using the received request data as the retrieval key, and registers the short apparatus-difference correction information obtained by the retrieval with database 40. Thus, the engineer of the mass-production line can obtain the short apparatus-difference correction information.

There are also the cases where the short apparatus-difference correction information is not stored in the storage device 17. In these cases, it is indicated on a display device (not shown) that the short apparatus-difference correction information is requested so as to prompt the engineer of the trial-production line to input it. If the short apparatus-difference correction information is inputted to the terminals 2a, 2b . . . by the engineer of the trial-production line, the inputted short apparatus-difference correction information is accepted by short apparatus-difference correction information input accepting means 19c. The accepted short apparatus-difference correction information is registered in the database 40 by the database registering means 16a.

The database registering means 16a may register the short apparatus-difference correction information in the database 40 and also send it to the mass-production managing computer 30 via the network 20. The sent short apparatus-difference correction information is received by the retrieval result data receiving means 39 of the mass-production managing computer 30.

Third Embodiment

Figure 10:
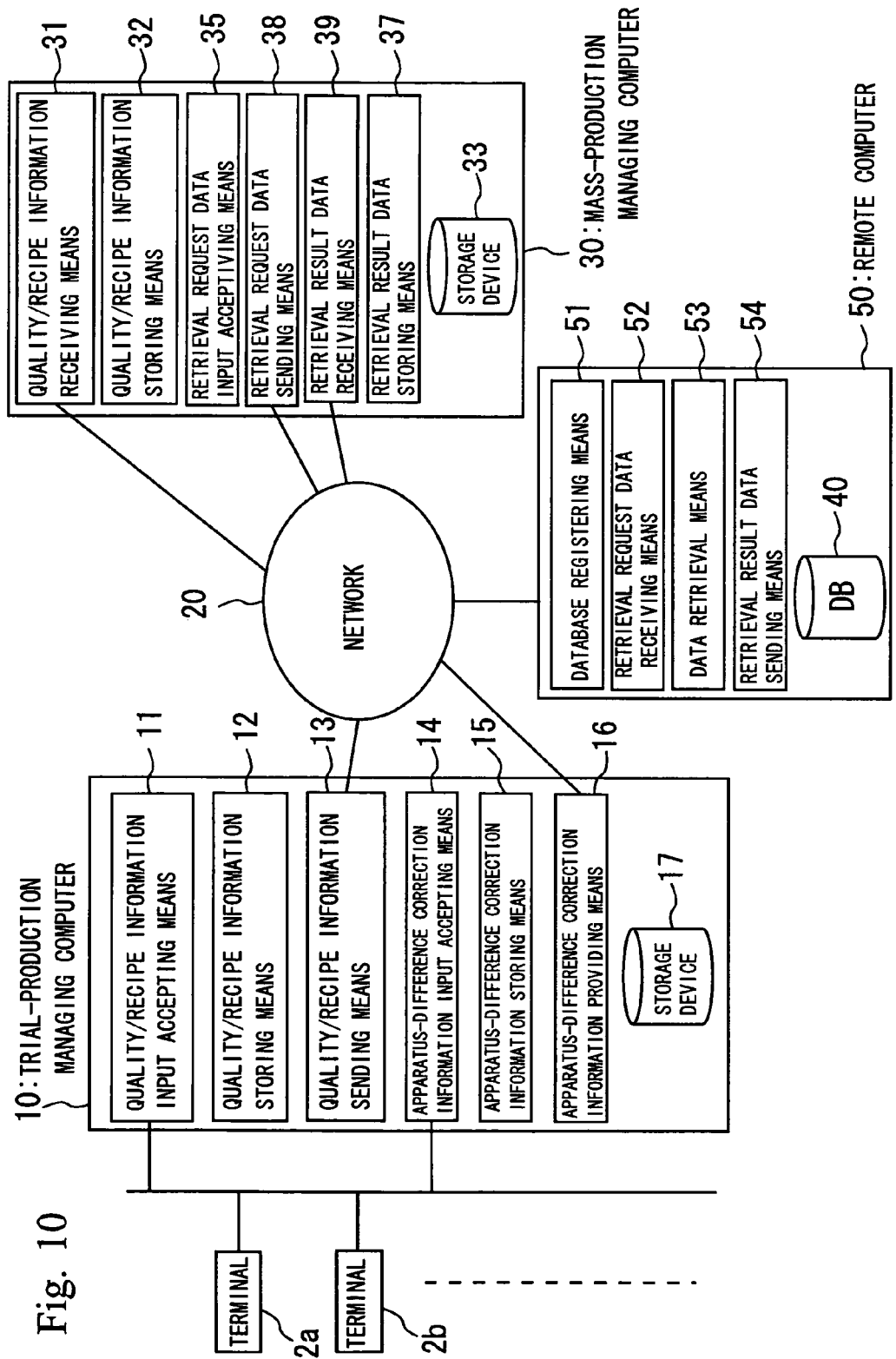
FIG. 10 is a diagram for describing a mass-production transfer support system according to a third embodiment.

FIG. 10 is a diagram for describing the mass-production transfer support system according to a third embodiment.

As shown in FIG. 10, the database 40 for accumulating the apparatus-difference correction information connected to a remote computer 50 connected to the network 20. The remote computer 50 is a computer different from both the trial-production managing computer 10 and the mass-production managing computer 30. The mass-production managing computer 30 can access the database 40 via the network 20. Hereafter, a description of the third embodiment will be given by centering on the portion different from the first and second embodiments.

The apparatus-difference correction information providing means 16 of the trial-production managing computer 10 reads the apparatus-difference correction information stored in the storage device 17 by the apparatus-difference correction information storing means 15, and sends the read apparatus-difference correction information to the remote computer 50 via the network 20.

The remote computer 50 comprises database registering means 51 for receiving the apparatus-difference correction information sent by the trial-production managing computer 10 via the network 20 and for registering the received apparatus-difference correction information in the database 40 by the product name or wafer ID, retrieval request data receiving means 52 for receiving the retrieval request data via the network 20, data retrieval means 53 for, in receiving the retrieval request data, retrieving the apparatus-difference correction information registered in the database 40 and outputting the apparatus-difference correction information as the retrieval result thereof, and retrieval result data sending means 54 for sending the outputted apparatus-difference correction information as the retrieval result to the mass-production managing computer 30 via the network 20.

The retrieval result data receiving means 39 of the mass-production managing computer 30 receives via the network 20 the apparatus-difference correction information as the retrieval result sent by the retrieval result data sending means 54 of the remote computer 50.

Next, the operation of the mass-production transfer support system, and in particular, the mass-production transfer using the mass-production transfer support system will be described.

The transfer of the quality information and recipe information is the same as that in the first embodiment, and so a description thereof will be omitted.

Hereafter, the transfer of the apparatus-difference correction information will be described.

After completing the trial-production or in the middle of the trial-production, if the apparatus-difference correction information is inputted to the terminals 2a, 2b . . . together with the product name or wafer ID by the engineers (I-Eng, E-Eng), the inputted apparatus-difference correction information is accepted by the apparatus-difference correction information input accepting means 14 of the trial-production managing computer 10. The accepted apparatus-difference correction information is stored in the storage device 17 by the apparatus-difference correction information storing means 15. The stored apparatus-difference correction information is read by the apparatus-difference correction information providing means 16, and the read apparatus-difference correction information is sent to the remote computer 50 via the network 20. The sent apparatus-difference correction information is received by the database registering means 51 of the remote computer 50 via the network 20, and the received apparatus-difference correction information is registered in the database 40 by the product name or wafer ID by the database registering means 51.

In the case where the quality of the semiconductor device is different from that of the trial-production due to existence of the apparatus-difference on the mass-production transfer, any retrieval request data such as the product name or wafer ID inputted then to the terminal (not shown) connected to the mass-production managing computer 30 by the engineer of the mass-production line is accepted by the retrieval request data input accepting means 35 of the mass-production managing computer 30. The accepted retrieval request data is sent to the remote computer 50 via the network 20 by the retrieval request data sending means 38. If the sent retrieval request data is received by the retrieval request data receiving means 52 of the remote computer 50 via the network 20, the apparatus-difference correction information registered in the database 40 is retrieved by the data retrieval means 53 by using the received retrieval request data as the retrieval key, and the apparatus-difference correction information as the retrieval result is sent to the mass-production managing computer 30 via the network 20 by the retrieval result data sending means 54. The sent apparatus-difference correction information as the retrieval result is received and outputted via the network 20 by retrieval result data receiving means 39 of the mass-production managing computer 30. The received apparatus-difference correction information is stored in the storage device 33 by the retrieval result data storing means 37. Thus, the apparatus-difference correction information is transferred to the mass-production line on demand.

Thereafter, the engineer of the mass-production line modifies the recipe data for the manufacturing apparatus based on the outputted apparatus-difference correction information, and downloads the modified recipe data to the manufacturing apparatus. Or else, the engineer of the mass-production line changes the parameter set in the manufacturing apparatus based on the outputted apparatus-difference correction information. Thus, the apparatus-difference existing between the manufacturing apparatuses of the trial-production line and the mass-production line is corrected by modifying the recipe data or changing the apparatus parameter based on the apparatus-difference correction information. It is thereby possible to conform the quality of the semiconductor device manufactured in the mass-production line to that of the trial-production, and to complete the mass-production transfer As described above, in the mass-production transfer from the trial-production line to the mass-production line according to the third embodiment, the apparatus-difference correction information generated or obtained in the trial-production stage is transferred on demand together with the quality information and recipe information. Thus, the engineer of the mass-production line can retrieve and obtain the apparatus-difference correction information registered in the database 40 and necessary to realize the quality equivalent to the trial-production by using the mass-production managing computer 30. Therefore, it is possible to have the mass-production transfer smoothly performed by the engineer of the mass-production line without dispatching to the mass-production transfer destination the engineers having engaged in development and trial-production of the new product.

Next, the first transformed example of the third embodiment will be described.

As described as to the first transformed example of the first embodiment, it is demanded to reduce total hours required for the development, trial-production and mass-production transfer of the semiconductor device. Thus, to meet this demand, this first transformed example will describe a form wherein the mass-production transfer support system according to the third embodiment is used to perform the mass-production trial in the trial-production line while the reproducibility thereof is sequentially checked in the mass-production line.

During the mass-production trial, the quality information and recipe information in the middle of the trial-production are sequentially inputted to the terminals 2a, 2b . . . by the engineers. Furthermore, the apparatus-difference correction information obtained during the mass-production trial is sequentially inputted to the terminals 2a, 2b . . . together with the product name or wafer ID by the engineers.

As described above, the inputted quality information and recipe information are accepted by the trial-production managing computer 10, and are sent to the mass-production managing computer 30 via the network 20. The sent quality information and recipe information are received by the mass-production managing computer 30, and the received quality information and recipe information are outputted and stored.

The recipe data for the manufacturing apparatus as the outputted recipe information has its format converted as required, and then is downloaded to the manufacturing apparatus of the mass-production line. And a check is made in the mass-production line as to the reproducibility of the mass-production trial in the trial-production line.

The inputted apparatus-difference correction information is accepted by the trial-production managing computer 10, and is sent to the remote computer 50 via the network 20. The sent apparatus-difference correction information is received by the remote computer 50, and is registered in the database 40 by the product name or wafer ID.

In the case where the reproducibility of the mass-production trial (that is, the reproducibility of the quality in the middle of the trial-production) cannot be obtained in the mass-production line, any retrieval request data such as the product name or wafer ID inputted to the terminal by the engineer of the mass-production line is accepted by the mass-production managing computer 30 as described above, and the accepted retrieval request data is sent to the remote computer 50 via the network 20. If the sent retrieval request data is received by the remote computer 50, the apparatus-difference correction information registered in the database 40 is retrieved by using the received retrieval request data as the retrieval key, and the apparatus-difference correction information as the retrieval result data is sent to the mass-production managing computer 30 via the network 20. The sent apparatus-difference correction information is received and outputted by the mass-production managing computer 30.

Thereafter, the engineer of the mass-production line modifies the recipe data for the manufacturing apparatus based on the outputted apparatus-difference correction information, and downloads the modified recipe data to the manufacturing apparatus. Or else, the engineer of the mass-production line changes the parameter set in the manufacturing apparatus based on the outputted apparatus-difference correction information. Thus, the apparatus-difference existing between the manufacturing apparatuses of the trial-production line and the mass-production line is corrected by modifying the recipe data or changing the parameter based on the apparatus-difference correction information. It is thereby possible to obtain the reproducibility of the mass-production trial in the mass-production line.

As described above, the first transformed example performs the mass-production trial in the trial-production line and the mass-production transfer (reproducibility check) in the mass-production line in parallel with a little time lag. Therefore, it is possible to reduce the total time required for the development, trial-production and mass-production transfer of the semiconductor device compared to the case of performing the mass-production transfer after completing the mass-production trial as in the third embodiment.

Next, the second transformed example of the third embodiment will be described.

According to the second transformed example, as with the second transformed example of the first embodiment, in the case where good results are obtained by the engineer of the mass-production line on checking the reproducibility of the mass-production trial like the first transformed example, the apparatus-difference correction information inputted by the engineer is registered in the database 40 so that the registered apparatus-difference correction information can be retrieved and obtained by the trial-production managing computer 10. Hereafter, a description will be given by centering on the portion different from the third embodiment.

Figure 11:
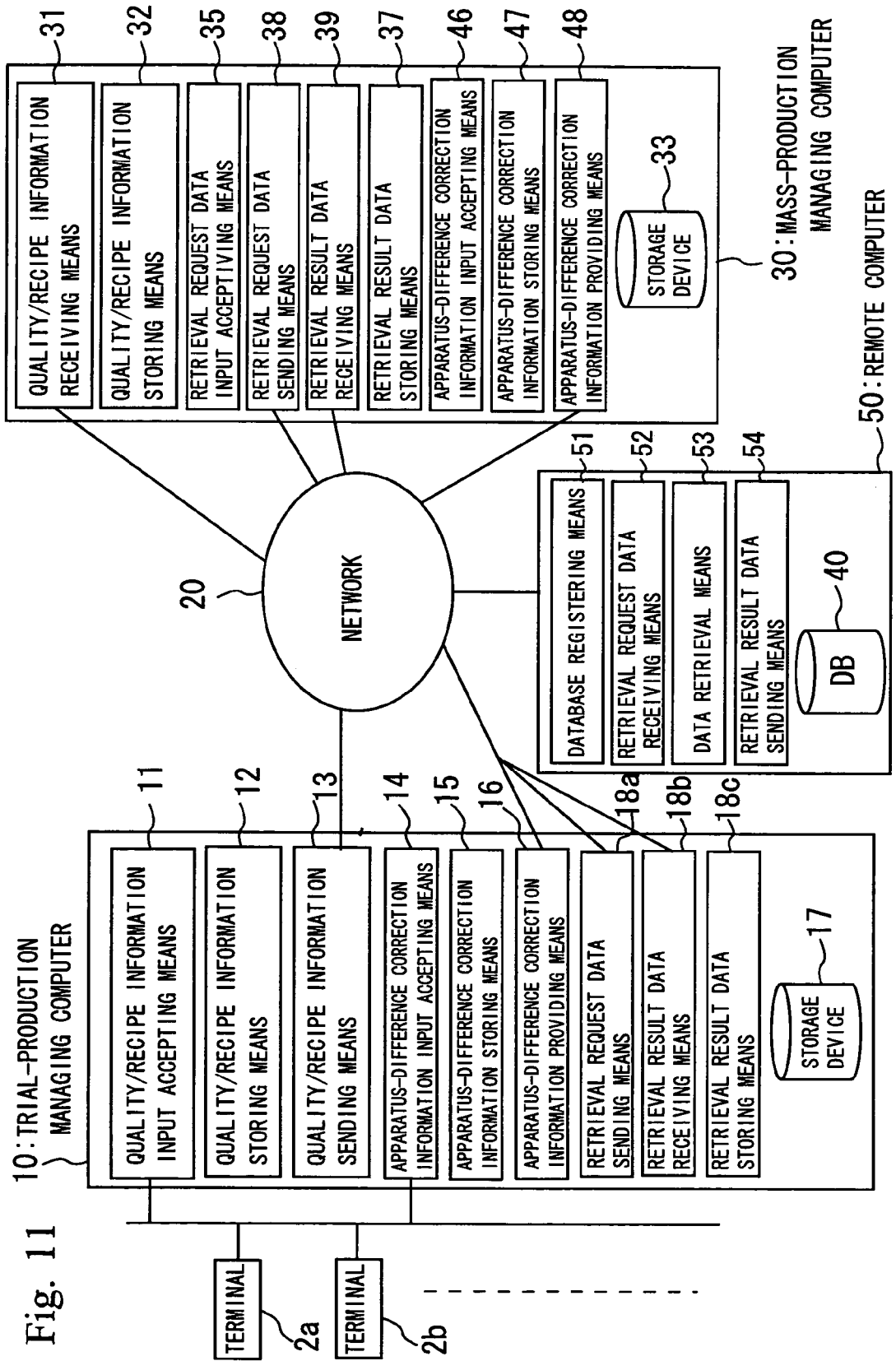
FIG. 11 is a block diagram for describing a second transformed example of a third embodiment of the present invention.

FIG. 11 is a block diagram for describing the second transformed example of the third embodiment of the present invention.

As shown in FIG. 11, the mass-production managing computer 30 further comprises apparatus-difference correction information input accepting means 46 for accepting an input of e apparatus-difference correction information, apparatus-difference correction information storing means 47 for storing the accepted apparatus-difference correction information in the storage device 33, and apparatus-difference correction information providing means 48 for reading the stored apparatus-difference correction information from the storage device 33 and sending the read apparatus-difference correction information to the remote computer 50 via the network 20. The database registering means 51 of the remote computer 50 receives the apparatus-difference correction information sent by the apparatus-difference correction information providing means 48 via the network 20, and registers the received apparatus-difference correction information in the database 40. The trial-production managing computer 10 further comprises the retrieval request data sending means 18a for sending the retrieval request data inputted by the terminals 2a, 2b . . . to the remote computer 50 via the network 20, the retrieval result data receiving means 18b for receiving the retrieval result data, and the retrieval result data storing means 18c for storing the received retrieval result data in the storage device 17.

If the apparatus-difference correction information is inputted to the terminal by the engineer of the mass-production line, the inputted apparatus-difference correction information is accepted by the apparatus-difference correction information input accepting means 46, and the accepted apparatus-difference correction information is stored in the storage device 33 by the apparatus-difference correction information storing means 47. The stored apparatus-difference correction information is read from the storage device 33 by the apparatus-difference correction information providing means 48, and the read apparatus-difference correction information is sent to the remote computer 50 via the network 20. The sent apparatus-difference correction information is received by the database registering means 51, and is registered in the database 40.

If the retrieval request data such as the product name or the wafer ID is inputted to the terminals 2a, 2b . . . by the engineer of the trial-production/development line, the inputted retrieval request data is accepted by the retrieval request data sending means 18a, and the accepted retrieval request data is sent to the remote computer 50 via the network 20. The sent retrieval request data is received by the retrieval request data receiving means 52. And the apparatus-difference correction information registered in the database 40 is retrieved by the data retrieval means 53 by using the received retrieval request data as the retrieval key, and then the retrieval result data is sent via the network 20 to the trial-production managing computer 10 by the retrieval result data sending means 54. The sent retrieval result data is received by the retrieval result data receiving means 18b, and the received retrieval result data is stored in the storage device 17 and is also outputted by the retrieval result data storing means 18c.

According to the second transformed example, the apparatus-difference correction information obtained in the mass-production line is registered in the database 40 so that it can be retrieved and obtained by the trial-production managing computer 10. Thus, the development can be performed both in the trial-production line and mass-production line in parallel. Therefore, it is possible to further reduce the total time required for the development, trial-production and mass-production transfer of the semiconductor device.

Next, the third transformed example of the third embodiment will be described.

The third transformed example allows the short apparatus-difference correction information to be requested and obtained from the mass-production line to the trial-production line as with the third transformed examples of the above-mentioned first and second embodiments.

Figure 12:
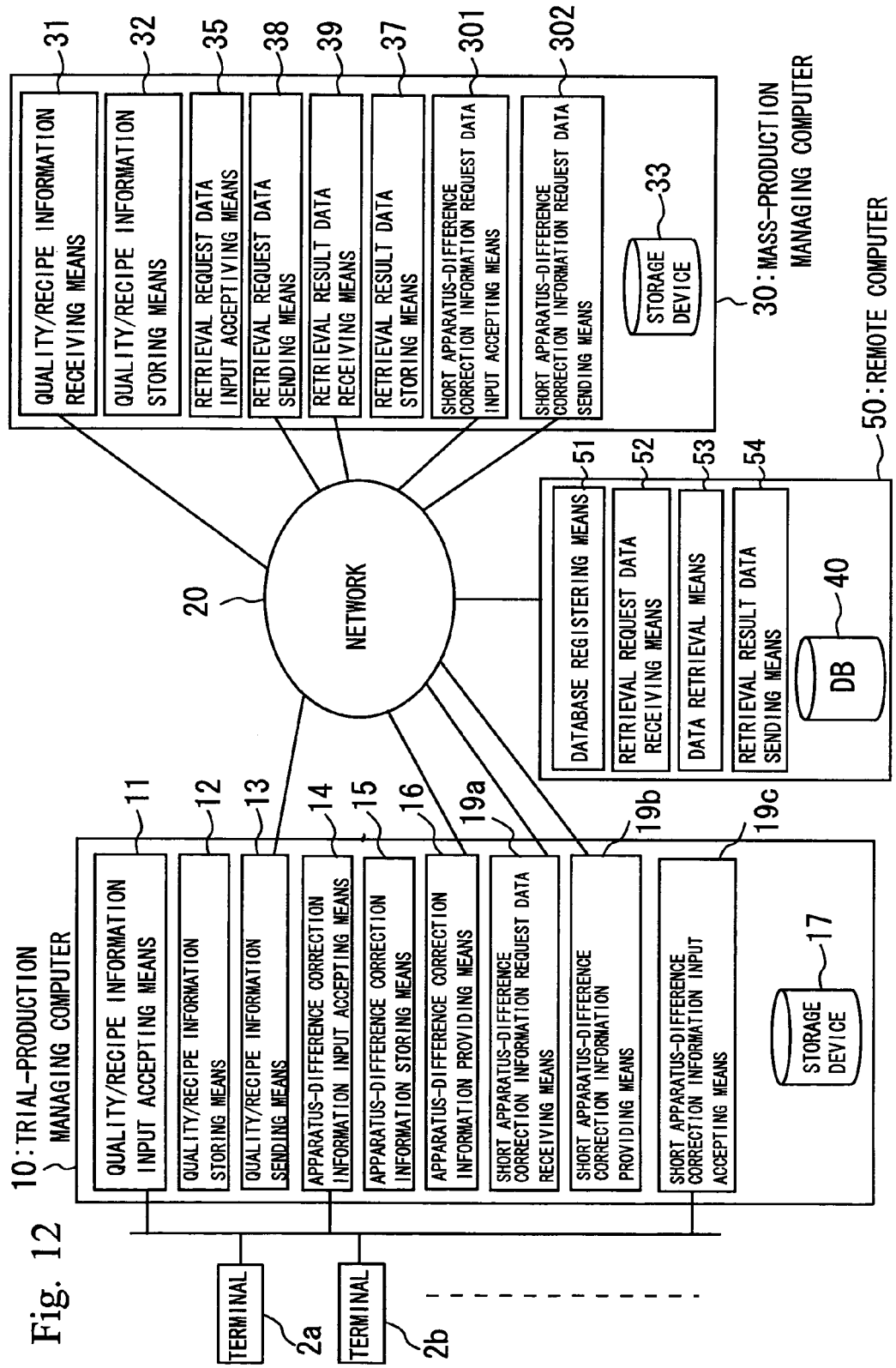
FIG. 12 is a block diagram for describing a third transformed example of the third embodiment of the present invention.

FIG. 12 is a block diagram for describing the third transformed example of the third embodiment of the present invention.

As shown in FIG. 12, in the case where the engineer of the mass-production line determines that the desired apparatus-difference correction information does not exist in the database 40, short apparatus-difference correction information request data for requesting the short apparatus-difference correction information (hereafter, referred to as the "request data") is inputted to the terminal. The inputted request data is accepted by short apparatus-difference correction information request data input accepting means 301 of the mass-production managing computer 30. The accepted request data is sent via the network 20 to the trial-production managing computer 10 by short apparatus-difference correction information request data sending means 302. The sent request data is received by the short apparatus-difference correction information request data receiving means 19a of the trial-production managing computer 10. The short apparatus-difference correction information providing means 19b retrieves the apparatus-difference correction information stored in the storage device 17 by using the received request data as the retrieval key, and sends the short apparatus-difference correction information obtained by the retrieval to the remote computer 50 via the network 20. The sent short apparatus-difference correction information is received by the database registering means 51 of the remote computer 50, and is registered in the database 40 by the database registering means 51. Thus, the engineer of the mass-production line can obtain the short apparatus-difference correction information.

There are also the cases where the short apparatus-difference correction information is not stored in the storage device 17. In these cases, it is indicated on the display device (not shown) that the short apparatus-difference correction information is requested so as to prompt the engineer of the trial-production line to input it. If the short apparatus-difference correction information is inputted to the terminals 2a, 2b . . . by the engineer of the trial-production line, the inputted short apparatus-difference correction information is accepted by the short apparatus-difference correction information input accepting means 19c. The accepted short apparatus-difference correction information is sent to the remote computer 50 by the short apparatus-difference correction information providing means 19b.

The short apparatus-difference correction information providing means 19b may send the short apparatus-difference correction information to the remote computer 50 and also send it to the mass-production managing computer 30. The sent short apparatus-difference correction information is received by the retrieval result data receiving means 39 of the mass-production managing computer 30.

Fourth Embodiment

According to the aforementioned first to third embodiments, the apparatus-difference correction information inputted to the terminals 2a, 2b . . . by the engineer is accepted by the apparatus-difference correction information input accepting means 14 of the trial-production managing computer 10. According to a fourth embodiment of the present invention, the apparatus detail data as one type of the apparatus-difference correction information is generated by exploiting EES (equipment engineering system).

Here, as shown in FIG. 3, the apparatus detail data includes operation detail data including the data indicating processed quantity in each chamber of the manufacturing apparatus, data indicating control (seasoning control) by NPW (non-product wafer such as a dummy wafer), data indicating dry cleaning control in the chamber, and device maintenance data indicating wet cleaning control in the chamber and replacement of device components, data indicating a configuration of the manufacturing apparatus, placement status data indicating a distance from the manufacturing apparatus to a plant main exhaust and facilities of the plant (coolant temperature, inactive gas pressure, etc.), process monitor data represented by a light emitting monitor, and particle data.

Figure 13:
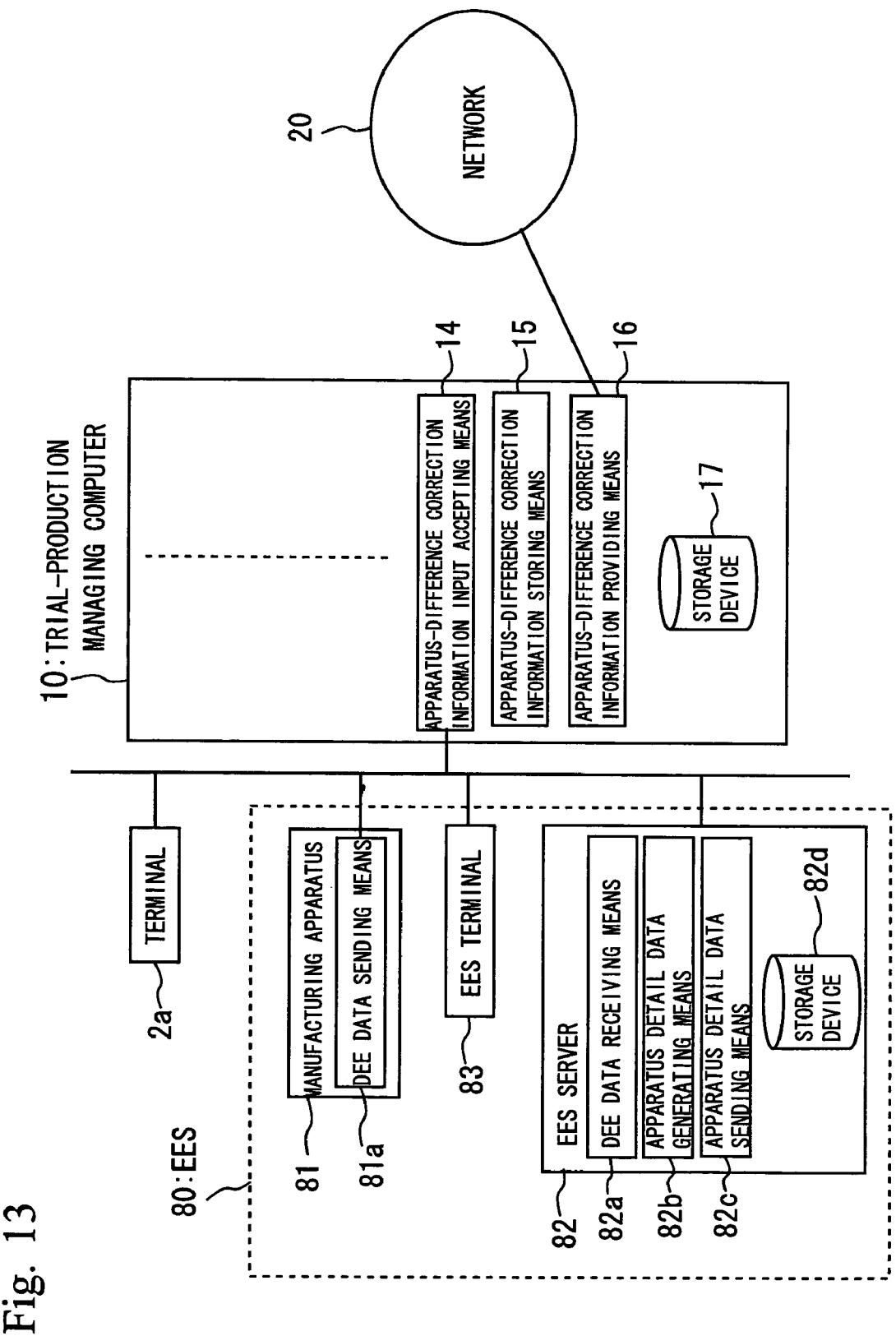
FIG. 13 is a block diagram for describing apparatus-difference correction information generating means of a fourth embodiment.

FIG. 13 is a block diagram for describing apparatus-difference correction information generating means of the fourth embodiment.

As shown in FIG. 13, an EES 80 serving as the apparatus-difference correction information generating means comprises a manufacturing apparatus 81, an EES server 82 and an EES terminal 83. The manufacturing apparatus 81, EES server 82 and EES terminal 83 constituting the EES 80 are connected to the trial-production managing computer 10 via-the network respectively. As described in the first to third embodiments, the trial-production managing computer 10 is connected to the mass-production managing computer (not shown) via the network 20.

The manufacturing apparatus 81 has DEE data sending means 81a for sending DEE (detailed equipment events) data indicating the operation or status change of the manufacturing apparatus 81 to the-EES server 82. Here, the DEE data may be wafer ID data and the data indicating wafer processing time, gas supply valve switching signals, gate valve switching signals, pump on/off signals, atmospheric pressure switch on/off signals,wafer carrier arm detection signals, wafer stage position detection signals and so on.

The EES server 82 comprises DEE data receiving means 82a for receiving the DEE data sent from the DEE data sending means 81a, apparatus detail data generating means 82b for selecting necessary DEE data from the received DEE data, generating the apparatus detail data from the selected DEE data and storing the generated apparatus detail data in a storage device 82d, and apparatus detail data sending means 82c for reading the stored apparatus detail data from the storage device 82d and sending the read apparatus detail data to the trial-production managing computer 10 via the network.

The apparatus detail data generating means 82b generates NPW control data indicating the number of dummy wafers necessary for chamber conditioning (seasoning) based on a plurality of pieces of selected wafer ID data, for instance. The apparatus detail data generating means 82b generates the operation detail data indicating an in-chamber wet cleaning period based on the pump on/off signals, atmospheric pressure switch on/off signals and so on, for instance.

The EES terminal 83 is the terminal for performing various inputs to the EES server 82. It is possible, as with the terminals 2a, 2b . . . , to have the apparatus detail data inputted to the EES terminal 83 by the engineer and have the inputted data accepted by the trial-production managing computer 10.

Next, the operation of the apparatus-difference correction information generating means, that is, the generation and input of the apparatus detail data will be described.

If the wafer is processed by the manufacturing apparatus 81 constituting the trial-production line, that is, the manufacturing apparatus 81 connected to the trial-production managing computer 10, the DEE data is generated. The generated DEE data is sent to the EES server 82 by the DEE data sending means 81a each time one wafer or a plurality of wafers are processed. The sent DEE data is received by the DEE data receiving means 82a of the EES server 82, and necessary DEE data is selected from the received DEE data by the apparatus detail data generating means 82b so that the apparatus detail data is generated from the selected DEE data. The generated apparatus detail data is stored in the storage device 82d by the apparatus detail data generating means 82b. The stored apparatus detail data is read by the apparatus detail data sending means 82c, and the read apparatus detail data is sent to the trial-production managing computer 10. The sent apparatus detail data is received by the apparatus-difference correction information input accepting means 14 of the trial-production managing computer 10, and the received apparatus detail data is accepted as the apparatus-difference correction information. The apparatus detail data as the accepted apparatus-difference correction information is stored in the storage device 17 by the apparatus-difference correction information storing means 15.

The registering in the database 40 and retrieval of the apparatus-difference correction information performed thereafter is the same as those in the first to third embodiments, and so a description thereof will be omitted.

As described above, according to the fourth embodiment, the apparatus detail data as the apparatus-difference correction information is generated based on the DEE data generated in the manufacturing apparatus 81, and the generated apparatus detail data is accepted by the apparatus-difference correction information input accepting means 14 of the trial-production managing computer 10. And the apparatus detail data is registered in the database 40 so as to be retrievable by using the mass-production managing computer 30. Thus, the engineer of the mass-production line can obtain the apparatus detail data as the apparatus-difference correction information and correct the apparatus-difference.

In addition, the engineer of the mass-production line can grasp an adjustment area and a performance area of the manufacturing apparatus constituting the mass-production line. For instance, after replacing a quartz component for maintenance, it is possible, according to which process is performed to how many wafers (how many times), to estimate a consumption amount of the quartz component placed in the chamber and further estimate a possibility of reducing a process margin depending on the consumption amount.

The fourth embodiment is applicable to the case of performing the mass-production transfer from one mass-production line (one mass-production plant) to another mass-production line (another mass-production plant), that is, developing it to a plurality of mass-production plants. In this case, it is possible to generate the apparatus detail data based on the DEE data obtained from a plurality of manufacturing apparatuses of the one mass-production line (one mass-production plant) having performed the mass-production earlier. Thus, it is possible to generate more apparatus detail data than that in the case of generating it in the trial-production line so that the engineer of the mass-production line can obtain a lot of apparatus detail data as the apparatus-difference correction information.

The fourth embodiment is also applicable to the case of performing the mass-production transfer from the joint development company to the semiconductor device manufacturers who are consigners as described above. In this case, it is possible, even if a new manufacturing apparatus is introduced to the mass-production line of the semiconductor device manufacturers who are consigners, to grasp the adjustment area and performance area of the manufacturing apparatus at an early stage.

On actually operating the manufacturing apparatus in the mass-production line, as described above, there is an inner apparatus-difference arising in the same manufacturing apparatus after the mass-production transfer in addition to an inter-apparatus apparatus-difference existing between the manufacturing apparatuses of the mass-production transfer source and the mass-production transfer destination on the mass-production transfer. The inner apparatus-difference means a difference in performance between the manufacturing apparatus at present and the manufacturing apparatus at the start, which is often a moment-to-moment change or a change arising in conjunction with a failure of the manufacturing apparatus, for instance. If the inner apparatus-difference arises, a difference in the quality of the semiconductor device occurs as in the case of the inter-apparatus apparatus-difference. Therefore, it is necessary to control the inner apparatus-difference of the manufacturing apparatus.

The fourth embodiment is also applicable to the case where such an inner apparatus-difference arises. To be more specific, in order to correct the difference in the quality of the semiconductor device in conjunction with the inner apparatus-difference, it is possible to effectively exploit the apparatus detail data as the apparatus-difference correction information generated by the EES 80 according to the fourth embodiment. In other words, it is possible to retrieve and obtain the apparatus detail data as the apparatus-difference correction information registered in the database 40 by using the mass-production managing computer 30 after the mass-production transfer. Therefore, it is possible to have the difference in the quality of the semiconductor device in conjunction with the inner apparatus-difference corrected by the engineer of the mass-production line without dispatching to the mass-production transfer destination the engineers having engaged in the development and trial-production of the new product.

The apparatus-difference correction information generating means described in the fourth embodiment is applicable to a semiconductor manufacturing system described later. To be more specific, the apparatus detail data generated by the EES 80 as the apparatus-difference correction information generating means is accepted as the apparatus-difference correction information by the apparatus-difference correction information input accepting means 14 of the trial-production managing computer 10 of the semiconductor manufacturing system.

Fifth Embodiment

Figure 14:
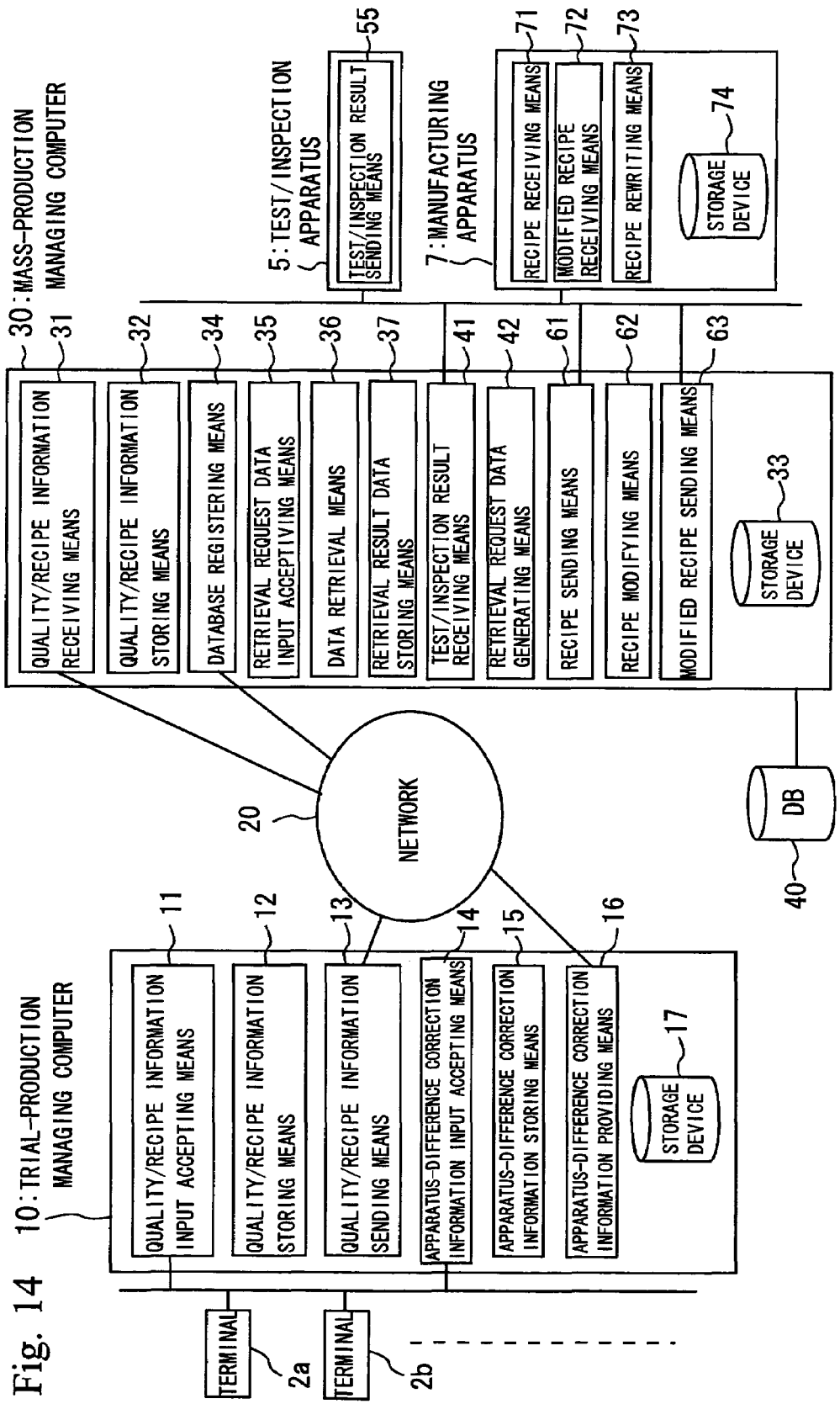
FIG. 14 is a block diagram for describing a semiconductor manufacturing system according to a fifth embodiment of the present invention.

FIG. 14 is a block diagram for describing the semiconductor manufacturing system according to the fifth embodiment of the present invention.

As shown in FIG. 14, the trial-production managing computer 10 for managing the trial-production line is connected via the network 20 to the mass-production managing computer 30 for managing the mass-production line. The mass-production managing computer 30 has the database 40 accessible by the mass-production managing computer 30 connected thereto. The database 40 has the above-mentioned apparatus-difference correction information (refer to FIG. 3) registered therein. The apparatus-difference correction information is registered by the product name or by the wafer ID for instance. To be more specific, the apparatus-difference correction information registered in the database 40 is retrieved by using the product name or the wafer ID as the retrieval key.

As described in the first embodiment, the trial-production managing computer 10 has a plurality of terminals 2a, 2b . . . connected thereto via the network. The trial-production managing computer 10 comprises the quality/recipe information input accepting means 11, quality/recipe information storing means 12, quality/recipe information sending means 13, apparatus-difference correction information input accepting means 14, apparatus-difference correction information storing means 15, apparatus-difference correction information providing means 16 and storage device 17.

The mass-production managing computer 30 has a test/inspection apparatus 5 and a manufacturing apparatus 7 connected thereto via the network. There are a plurality of the test/inspection apparatuses 5 and a plurality of the manufacturing apparatuses 7 respectively, which constitute the mass-production line.

As described in the first embodiment, the mass-production managing computer 30 comprises the quality/recipe information receiving means 31, quality/recipe information storing means 32, storage device 33, database registering means 34, retrieval request data input accepting means 35, data retrieval means 36 and retrieval result data storing means 37.

The mass-production managing computer 30 further comprises test/inspection result data receiving means 41 for receiving test/inspection result data sent from the test/inspection apparatuses 5 and retrieval request data generating means 42 for determining whether or not the received test/inspection result data meets predetermined criteria (also called "standard") and generating the retrieval request data in the case of not meeting the criteria. To be more specific, the retrieval request data generating means 42 reads from the storage device 33 the quality information transferred from the trial-production managing computer 10 and compares the read quality information to the test/inspection result data, and the retrieval request data generating means 42 determines that it meets the predetermined criteria if they are equivalent.

The retrieval request data input accepting means 35 of the mass-production managing computer 30 accepts the retrieval request data generated by the retrieval request data generating means 42. When the retrieval request data is accepted by the retrieval request data input accepting means 35, the data retrieval means 36 retrieves the apparatus-difference correction information registered in the database 40.

The mass-production managing computer 30 further comprises recipe sending means 61 for reading from the storage device 33 the recipe data out of the recipe information stored therein by the quality/recipe information storing means 32 and sending the read recipe data to the manufacturing apparatuses 7, recipe modifying means 62 for reading the apparatus-difference correction information stored in the storage device 33 by the retrieval result data storing means 37 and modifying the recipe data based on the read apparatus-difference correction information, and modified recipe-sending means 63 for sending the recipe data modified by the recipe modifying means 62 (hereafter, referred to as "modified recipe data") to the manufacturing apparatuses 7.

The test/inspection apparatus 5 performs a test and/or an inspection of the semiconductor device or wafer to which a predetermined process has been performed by the manufacturing apparatus 7. It may be a logic test apparatus for performing an electric test, a memory test apparatus, a CD SEM apparatus and soon. The test/inspection apparatus 5 comprises test/inspection result data sending means 55 for sending the test/inspection result data indicating the quality of the semiconductor device to the mass-production managing computer 30.

The manufacturing apparatus 7 is a device for performing a process based on the recipe data. It may be a CVD apparatus, a PVD apparatus, an etching apparatus, a CMP apparatus, an anneal apparatus and so on, for instance. The manufacturing apparatus 7 comprises recipe receiving means 71 for receiving the recipe data sent by the recipe sending means 61 of the mass-production managing computer 30 and storing the received recipe data in a storage device 74, modified recipe receiving means 72 for receiving modified recipe data sent by the modified recipe sending means 62 of the mass-production managing computer 30, and recipe rewriting means 73 for rewriting the recipe data by storing the received modified recipe data in the storage device 74.

Next, the operation of the semiconductor manufacturing system, and in particular, the method of manufacturing the semiconductor device by using the semiconductor manufacturing system will be described.

First, the transfer of the quality information and recipe information will be described.

After completing the trial-production, if the quality information and recipe information are inputted to the terminals 2a, 2b . . . by the engineers engaged in the development and trial-production of the new product, the inputted quality information and recipe information are accepted by the quality/recipe information input accepting means 11 of the trial-production managing computer 10. The accepted quality information and recipe information are stored in the storage device 17 by the quality/recipe information storing means 12. The stored quality information and recipe information are read from the storage device 33 by the quality/recipe information sending means 13, and are sent to the mass-production managing computer 30 via the network 20. The sent quality information and recipe information are received by the quality/recipe information receiving means 31 of the mass-production managing computer 30 via the network 20. The received quality information and recipe information are stored in the storage device 33 by the quality and recipe information storing means 32. Of the stored recipe information, the recipe data for the manufacturing apparatus is read from the storage device 33 by the recipe sending means 61. The read data has its format converted as required, and then is sent to the manufacturing apparatus 7. The sent recipe data is received by the recipe receiving means 72 of the manufacturing apparatus 7, and the received recipe data is stored in a storage device 75. Thus, the quality information and recipe information are transferred to the mass-production line.

The transfer of the apparatus-difference correction information is the same as the contents described in the first embodiment, and so a description thereof will be omitted.

And a predetermined process is performed by the manufacturing apparatus 7 based on the transferred recipe data.

After performing the process, the semiconductor device or wafer (not shown) is carried to the test/inspection apparatus 5, where the test and inspection of the semiconductor device or wafer are performed. On finishing the test and inspection, the test/inspection result data indicating the quality of the semiconductor device is sent to the mass-production managing computer 30 by the test/inspection result data sending means 55. The sent test/inspection result data is received by the test/inspection result data receiving means 41 of the mass-production managing computer 30, and it is determined by the retrieval request data generating means 42 whether or not the received test/inspection result data meets the predetermined criteria. If it meets the criteria, the mass-production transfer is completed by determining that the quality of the semiconductor device manufactured in the mass-production line is not different from that of the trial-production, that is, they are equivalent. If it does not meet the criteria, it is determined that the quality of the semiconductor device manufactured in the mass-production line is different from that of the trial-production, and the apparatus-difference correction information for correcting the difference in the quality is retrieved and obtained as described below.

First, the retrieval request data is generated by the retrieval request data generating means 42. The retrieval request data is the product name or the wafer ID for instance. The generated retrieval request data is accepted by the retrieval request data input accepting means 35.

Thereafter, as described in the first embodiment, the apparatus-difference correction information registered in the database 40 is retrieved by using the accepted retrieval request data as the retrieval key by the data retrieval means 36, and the apparatus-difference correction information as the retrieval result is stored in the storage device 33 by the retrieval result data storing means 37. In the case where a plurality of pieces of the apparatus-difference correction information are registered, they are outputted by the data retrieval means 36 in order from the latest one registered. The stored apparatus-difference correction information is read by the recipe modifying means 62, and the recipe data is modified by the recipe modifying means 62 based on the read apparatus-difference correction information. The modified recipe data is sent to the manufacturing apparatus 7 by the modified recipe sending means 63. The sent modified recipe data is received by the modified recipe data receiving means 72 of the manufacturing apparatus 7, and the received modified recipe data is stored in the storage device 74 by the recipe rewriting means 73. Thus, the recipe data of the manufacturing apparatus 7 is rewritten.

Thereafter, the process is performed by the manufacturing apparatus 7 based on the modified recipe data, and the test and inspection are performed by the test/inspection apparatus 5. As described above, the test/inspection result data is sent to the mass-production managing computer 30, where it is determined whether or not the test/inspection result data meets the predetermined criteria. If it meets the criteria, the mass-production transfer is completed by determining that the difference in the quality has been corrected. If it does not meet the criteria, the apparatus-difference correction information is retrieved and obtained again.

As described above, according to the fifth embodiment, the quality information and recipe information are transferred and the apparatus-difference correction information generated or obtained in the trial-production stage is also transferred on demand on the mass-production transfer from the trial-production line to the mass-production line. And in the case where the quality of the semiconductor device manufactured in the mass-production line is different from that of the trial-production, the apparatus-difference correction information for correcting the difference in the quality is retrieved and obtained from the database 40, and the recipe data of the manufacturing apparatus 7 is modified based on the obtained apparatus-difference correction information so as to manufacture the semiconductor device using the modified recipe data. Therefore, it is possible to automatically perform the mass-production transfer from the trial-production line to the mass-production line without depending on the engineers engaged in the development/trial-production of the new product and the engineer of the mass-production line so as to allow a smooth mass-production transfer.

As in the transformed examples of the first embodiment, it is possible, by using the semiconductor manufacturing system according to the fifth embodiment, to perform the mass-production trial in the trial-production line while reproducibility thereof is sequentially checked in the mass-production line (same as to the sixth and seventh embodiments described later).

To be more specific, once the quality information and recipe information in the middle of the trial-production and the apparatus-difference correction information generated or obtained during the trial-production are sequentially inputted to the terminal 2a, the inputted information is accepted by the trial-production managing computer 10 and is sent to the mass-production managing computer 30 via the network 20. The sent quality information and recipe information are received by the mass-production managing computer 30.

Of the received recipe information, the recipe data for the manufacturing apparatus is sent to the manufacturing apparatus 7. The process is performed by the manufacturing apparatus 7 based on the received recipe data. Thereafter, the test and inspection of the semiconductor device or wafer are performed by the test/inspection apparatus 5. The test/inspection result data indicating the quality of the semiconductor device is sent to the mass-production managing computer 30, where it is determined whether or not the test/inspection result data meets the predetermined criteria by the retrieval request data generating means 42. If it meets the criteria, it means that the reproducibility of the mass-production trial is obtained. If it does not meet the criteria, it means that the reproducibility of the mass-production trial is not obtained so that the apparatus-difference correction information for correcting the difference in the quality is retrieved and obtained again as described in the fifth embodiment.

Thus, the mass-production trial in the trial-production line and the mass-production transfer (reproducibility check) in the mass-production line are performed in parallel with a little time lag. Therefore, it is possible to reduce the total time required for the development, trial-production and mass-production transfer of the semiconductor device.

Next, a transformed example of the fifth embodiment will be described.

The above-mentioned fifth embodiment described the case of modifying the recipe data of the manufacturing apparatus based on the obtained apparatus-difference correction information. In this transformed example, a description will be given as to the case of changing the parameter set in the manufacturing apparatus based on the obtained apparatus-difference correction information. Hereafter, a description will be given by centering on the portion different from the fifth embodiment.

Figure 15:
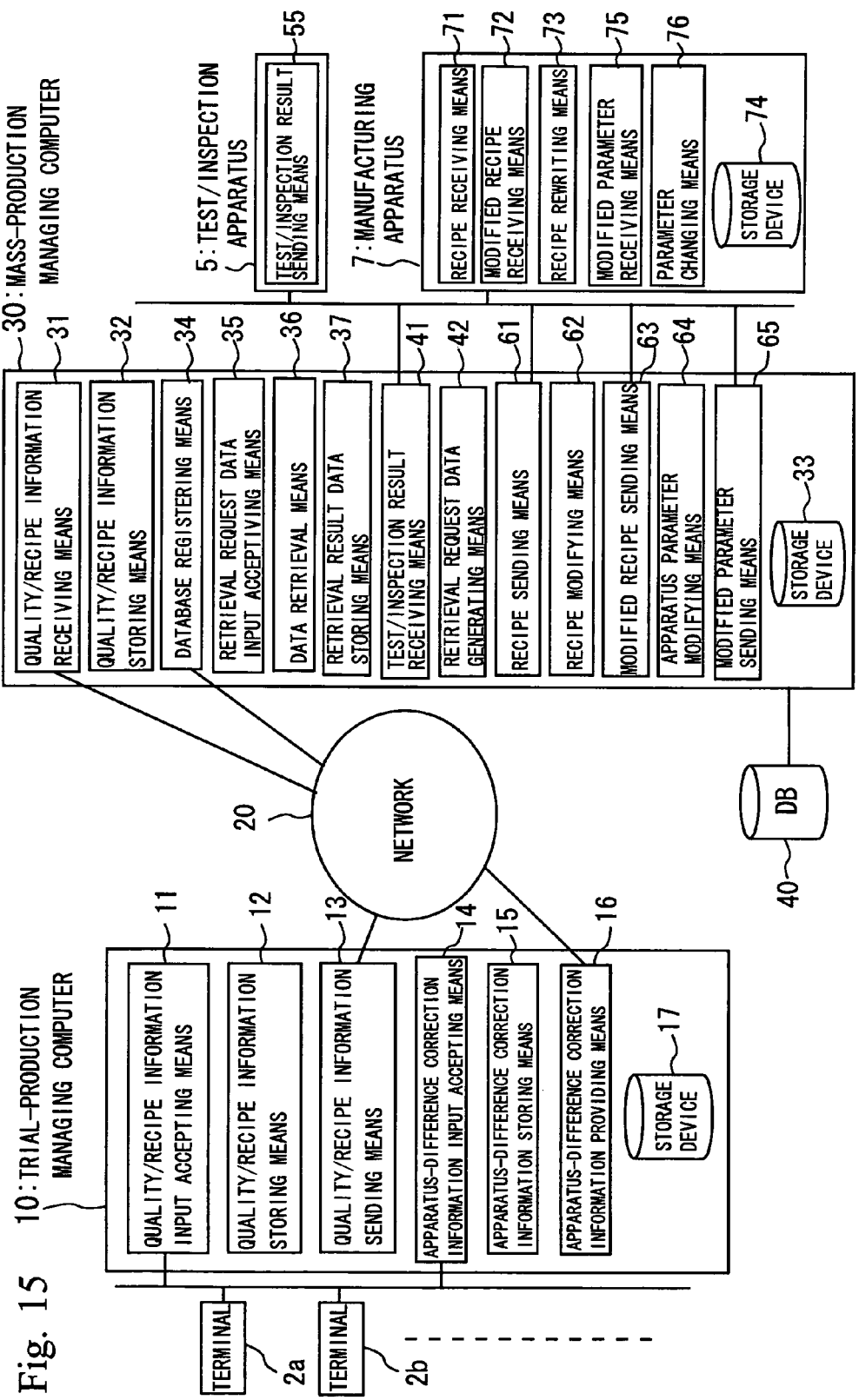
FIG. 15 is a block diagram for describing a transformed example of the fifth embodiment of the present invention.

FIG. 15 is a block diagram for describing the transformed example of the fifth embodiment of the present invention.

As shown in FIG. 15, the mass-production managing computer 30 further comprises apparatus parameter modifying means 64 for reading from the storage device 33 parameter data set in the manufacturing apparatus 7 and stored in the storage device 33 in advance and the apparatus-difference correction information stored in the storage device 33 by the retrieval result data storing means 37 and modifying the parameter data based on the apparatus-difference correction information, and modified parameter sending means 65 for sending the modified parameter data (hereafter, referred to as the "modified parameter data") to the manufacturing apparatus 7.

The manufacturing apparatus 7 connected to the mass-production managing computer 30 via the network comprises modified parameter receiving means 75 for receiving the modified parameter data sent by the modified parameter sending means 65 of the mass-production managing computer 30, and parameter changing means 76 for changing the parameter data by storing the received modified parameter data in the storage device 74.

Next, a description will be given as to the retrieval and obtaining of the apparatus-difference correction information and change of the parameter in the manufacturing apparatus.

If the retrieval request data generating means 42 of the mass-production managing computer 30 determines that the test/inspection result data does not meet the predetermined criteria and the generated retrieval request data is accepted by the retrieval request data input accepting means 35, as described in the first embodiment, the apparatus-difference correction information registered in the database 40 is retrieved by the data retrieval means 36 by using the accepted retrieval request data as the retrieval key. The apparatus-difference correction information as the retrieval result is stored in the storage device 33 by the retrieval result data storing means 37. The parameter data set in the manufacturing apparatus 7 and stored in the storage device 33 in advance and the apparatus-difference correction information stored in the storage device 33 by the retrieval result data storing means 37 are read from the storage device 33 by the apparatus parameter modifying means 64, and the parameter data is modified based on the apparatus-difference correction information. The modified parameter data is sent to the manufacturing apparatus 7 by the modified parameter sending means 65. The sent modified parameter data is received by the modified parameter receiving means 75 of the manufacturing apparatus 7, and the received modified parameter data is stored in the storage device 74 by the parameter changing means 76. Thus, the parameter data set in the manufacturing apparatus 7 is changed.

According to this transformed example, it is also possible to automatically perform the mass-production transfer from the trial-production line to the mass-production line without depending on the engineers engaged in the development/trial-production of the new product and the engineer of the mass-production line so as to allow the smooth mass-production transfer.

Sixth Embodiment

Figure 16:
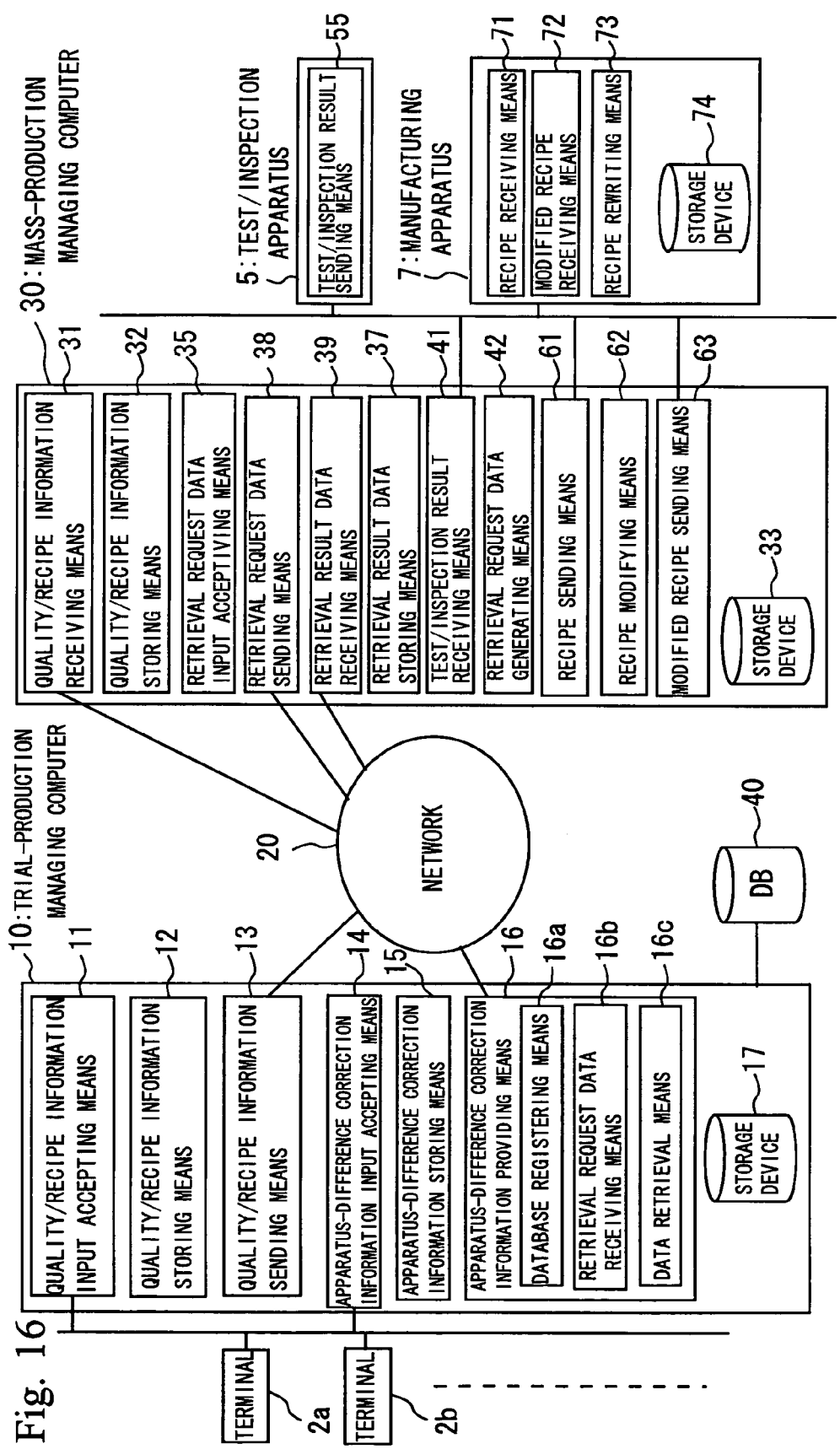
FIG. 16 is a block diagram for describing a semiconductor manufacturing system according to a sixth embodiment of the present invention.

FIG. 16 is a block diagram for describing the semiconductor manufacturing system according to a sixth embodiment of the present invention.

As shown in FIG. 16, the database 40 in which the apparatus-difference correction information is accumulated is not connected to the mass-production managing computer 30 as in the fifth embodiment but is connected to the trial-production managing computer 10. The mass-production managing computer 30 can access the database 40 via the network 20. According to the sixth embodiment, the necessary apparatus-difference correction information is transferred on demand. Hereafter, a description will be given by centering on the portion different from the fifth embodiment.

As described in the second embodiment, the apparatus-difference correction information providing means 16 of the trial-production managing computer 10 comprises the database registering means 16a, retrieval request data receiving means 16b and data retrieval means 16c. The mass-production managing computer 30 comprises the quality/recipe information receiving means 31, quality/recipe information storing means 32, storage device 33, database registering means 34, retrieval request data input accepting means 35, data retrieval means 36 and retrieval result data storing means 37.

As described in the fifth embodiment, the mass-production managing computer 30 further comprises test/inspection result data receiving means 41 for receiving test/inspection result data sent from the test/inspection apparatuses 5 and retrieval request data generating means 42 for determining whether or not the received test/inspection result data meets predetermined criteria and generating the retrieval request data in the case of not meeting the criteria.

The mass-production managing computer 30 further comprises the recipe sending means 61 for reading from the storage device 33 the recipe data out of the recipe information stored therein by the quality/recipe information storing means 32 and for sending the read recipe data to the manufacturing apparatuses 7, the recipe modifying means 62 for reading the apparatus-difference correction information stored in the storage device 33 by the retrieval result data storing means 37 and for modifying the recipe data based on the read apparatus-difference correction information, and the modified recipe sending means 63 for sending the recipe data modified by the recipe modifying means 62 (hereafter, referred to as "modified recipe data") to the manufacturing apparatuses 7 as shown in the fifth embodiment. The mass-production managing computer 30 further has the test/inspection apparatuses 5 and manufacturing apparatuses 7 connected thereto via the network. The test/inspection apparatuses 5 and manufacturing apparatuses 7 are the same as those in the fifth embodiment, and so a description thereof will be omitted.

Next, the operation of the semiconductor manufacturing system, and in particular, the method of manufacturing the semiconductor device by using the semiconductor manufacturing system will be described.

The transfer of the quality information and recipe information is the same as that in the fifth embodiment, and so a description thereof will be omitted.

After the transfer of the quality information and recipe information, the predetermined process is performed by the manufacturing apparatus 7 based on the transferred recipe data.

As in the fifth embodiment, after performing the process, it is determined by the retrieval request data generating means 42 of the mass-production managing computer 30 whether or not the test/inspection result data meets the predetermined criteria. If it does not meet the criteria, it is determined that the quality of the semiconductor device manufactured in the mass-production line is different from that of the trial-production, so that the apparatus-difference correction information for correcting the difference in the quality is retrieved and obtained as described below.

First, the retrieval request data is generated by the retrieval request data generating means 42. The retrieval request data is the product name or the wafer ID for instance. The generated retrieval request data is accepted by the retrieval request data input accepting means 35.

Thereafter, as described in the second embodiment, the accepted retrieval request data is sent to the trial-production managing computer 10 by the retrieval request data sending means 38. If the sent retrieval request data is received by the retrieval request data receiving means 16b, the apparatus-difference correction information registered in the database 40 is retrieved by the data retrieval means 16c by using the received retrieval request data as the retrieval key, and the apparatus-difference correction information as the retrieval result data is sent to the mass-production managing computer 30 via the network 20. In the case where a plurality of pieces of the apparatus-difference correction information are registered, they are retrieved and outputted by the data retrieval means 36 in order from the latest one registered. The sent retrieval result data is received by the retrieval result data receiving means 39, and the received retrieval result data is stored in the storage device 33 by the retrieval result data storing means 37. The stored apparatus-difference correction information is read by the recipe modifying means 62, and the recipe data is modified by the recipe modifying means 62 based on the read apparatus-difference correction information. The modified recipe data is sent to the manufacturing apparatus 7 by the modified recipe sending means 63. The sent modified recipe data is received by the modified recipe data receiving means 72 of the manufacturing apparatus 7, and the received modified recipe data is stored in the storage device 74 by the recipe rewriting means 73. Thus, the recipe data of the manufacturing apparatus 7 is rewritten.

Thereafter, the process is performed by the manufacturing apparatus 7 based on the modified recipe data, and the test and inspection are performed by the test/inspection apparatus 5. As described above, the test/inspection result data is sent to the mass-production managing computer 30, where it is determined whether or not the test/inspection result data meets the predetermined criteria. If it meets the criteria, the mass-production transfer is completed by determining that the difference in the quality has been corrected. If it does not meet the criteria, the apparatus-difference correction information is retrieved and obtained again.

As described above, according to the sixth embodiment, the quality information and recipe information are transferred and the apparatus-difference correction information generated or obtained in the trial-production stage is also transferred, in the mass-production transfer from the trial-production line to the mass-production line. And in the case where the quality of the semiconductor device manufactured in the mass-production line is different from that of the trial-production, the apparatus-difference correction information for correcting the difference in the quality is retrieved and obtained from the database 40, and the recipe data of the manufacturing apparatus 7 is modified based on the obtained apparatus-difference correction information so as to manufacture the semiconductor device according to the modified recipe data. Therefore, it is possible to automatically perform the mass-production transfer from the trial-production line to the mass-production line without depending on the engineers engaged in the development/trial-production of the new product and the engineer of the mass-production line so as to allow the smooth mass-production transfer.

Next, a transformed example of the sixth embodiment will be described.

The above-mentioned sixth embodiment described the case of modifying the recipe data of the manufacturing apparatus based on the obtained apparatus-difference correction information. In this transformed example, as in the transformed example of the fifth embodiment, a description will be given as to the case of changing the parameter set in the manufacturing apparatus based on the obtained apparatus-difference correction information. Hereafter, a description will be given by centering on the portion different from the fifth embodiment.

Figure 17:
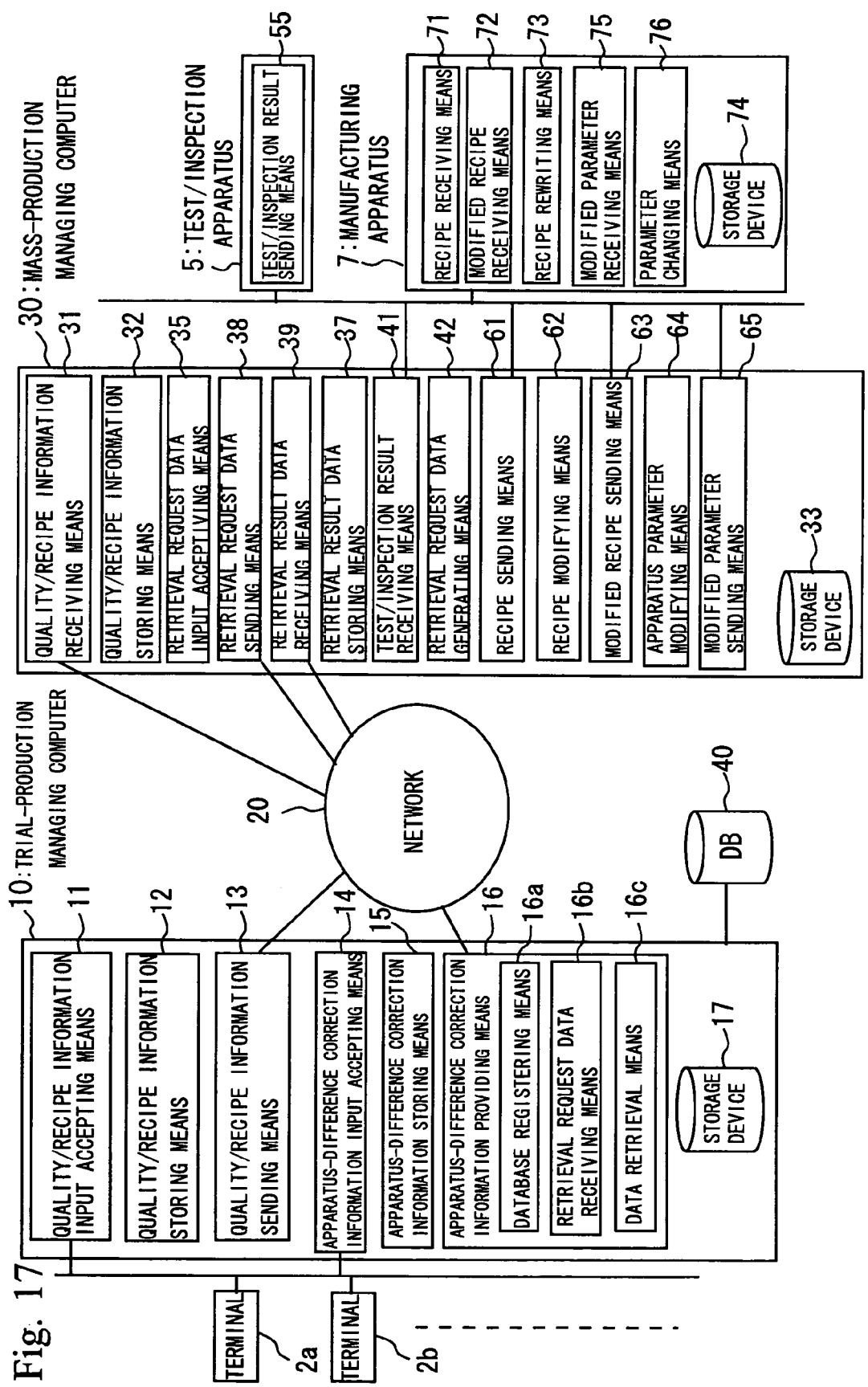
FIG. 17 is a block diagram for describing a transformed example of the sixth embodiment of the present invention.

FIG. 17 is a block diagram for describing the transformed example of the sixth embodiment of the present invention.

As described in the transformed example of the fifth embodiment, the mass-production managing computer 30 further comprises the apparatus parameter modifying means 64 and modified parameter sending means 65. And the manufacturing apparatus 7 connected to the mass-production managing computer 30 via the network further comprises the modified parameter receiving means 75 and parameter changing means 76.

Next, a description will be given as to the retrieval and obtaining of the apparatus-difference correction information and change of the parameter in the manufacturing apparatus.

If the retrieval request data generating means 42 of the mass-production managing computer 30 determines that the test/inspection result data does not meet a predetermined criterion and the generated retrieval request data is accepted by the retrieval request data input accepting means 35, as described in the second embodiment, the accepted retrieval request data is sent to the trial-production managing computer 10 by the retrieval request data sending means 38. If the sent retrieval request data is received by the retrieval request data receiving means 16*b*, the apparatus-difference correction information registered in the database 40 is retrieved by the data retrieval means 16*c* by using the received retrieval request data as the retrieval key, and the apparatus-difference correction information as the retrieval result data is sent to the mass-production managing computer 30 via the network 20. The sent retrieval result data is received by the retrieval result data receiving means 39, and the received retrieval result data is stored in the storage device 33 by the retrieval result data storing means 37. The parameter data set in the manufacturing apparatus 7 and stored in the storage device 33 in advance and the apparatus-difference correction information stored in the storage device 33 by the retrieval result data storing means 37 are read from the storage device 33 by the apparatus parameter modifying means 64, and the parameter data is modified based on the apparatus-difference correction information. The modified parameter data is sent to the manufacturing apparatus 7 by the modified parameter sending means 65. The sent modified parameter is received by the modified parameter receiving means 75 of the manufacturing apparatus 7, and the received modified parameter data is stored in the storage device 74 by the parameter changing means 76. Thus, the parameter data set in the manufacturing apparatus 7 is changed.

According to this transformed example, it is also possible to automatically perform the mass-production transfer from the trial-production line to the mass-production line without depending on the engineers engaged in the development/trial-production of the new product and the engineer of the mass-production line so as to allow a smooth mass-production transfer.

Seventh Embodiment

Figure 18:
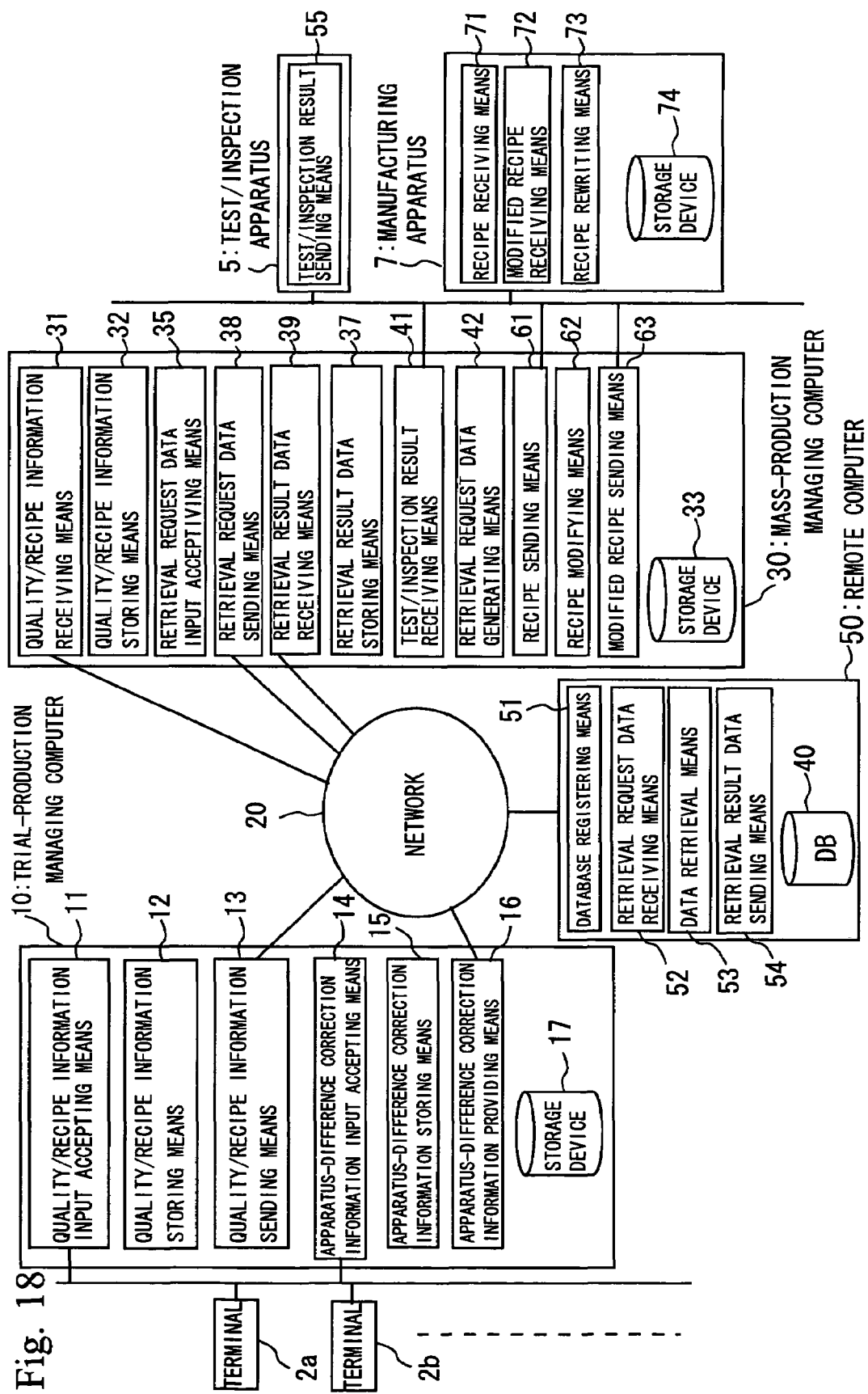
FIG. 18 is a block diagram for describing a semiconductor manufacturing system according to a seventh embodiment of the present invention.

FIG. 18 is a block diagram for describing the semiconductor manufacturing system according to a seventh embodiment of the present invention.

As shown in FIG. 18, the database 40 for accumulating the apparatus-difference correction information is connected to the remote computer 50 connected to the network 20. The remote computer 50*a* is a computer different from both the trial-production managing computer 10 and the mass-production managing computer 30. The mass-production managing computer 30 can access the database 40 via the network 20. The seventh embodiment also transfers the necessary apparatus-difference correction information on demand. Hereafter, a description of the seventh embodiment will be given by centering on the portion different from the fifth and sixth embodiments.

As described in the third embodiment, the apparatus-difference correction information providing means 16 of the trial-production managing computer 10 reads the apparatus-difference correction information stored in the storage device 17 stored by the apparatus-difference correction information storing means 15, and sends the read apparatus-difference correction information to the remote computer 50 via the network 20. The remote computer 50 comprises the database registering means 51, retrieval request data receiving means 52, data retrieval means 53 and retrieval result data sending means 54.

As described in the fifth and sixth embodiments, the mass-production managing computer 30 further comprises the test/inspection result data receiving means 41 for receiving the test/inspection result data sent from the test/inspection apparatuses 5 and retrieval request data generating means 42 for determining whether or not the received test/inspection result data meets the predetermined criteria and for generating the retrieval request data in the case of not meeting the criteria.

As described in the fifth and sixth embodiments, the mass-production managing computer 30 further comprises the recipe sending means 61 for reading from the storage device 33 the recipe data out of the recipe information stored therein by the quality/recipe information storing means 32 and for sending the read recipe data to the manufacturing apparatuses 7, the recipe modifying means 62 for reading the apparatus-difference correction information stored in the storage device 33 by the retrieval result data storing means 37 and for modifying the recipe data based on the read apparatus-difference correction information, and the modified recipe sending means 63 for sending the recipe data modified by the recipe modifying means 62 (hereafter, referred to as "modified recipe data") to the manufacturing apparatuses 7. The mass-production managing computer 30 also has the test/inspection apparatuses 5 and manufacturing apparatuses 7 connected thereto via the network. The test/inspection apparatuses 5 and manufacturing apparatuses 7 are the same as those in the fifth embodiment, and so a description thereof will be omitted.

Next, the operation of the semiconductor manufacturing system, and in particular, the method of manufacturing the semiconductor device by using the semiconductor manufacturing system will be described.

The transfer of the quality information and recipe information is the same as that in the fifth embodiment, and so a description thereof will be omitted.

After the transfer of the quality information and recipe information, the predetermined process is performed by the manufacturing apparatus 7 based on the transferred recipe data.

As in the fifth embodiment, after performing the process, it is determined by the retrieval request data generating means 42 of the mass-production managing computer 30 whether or not the test/inspection result data meets the predetermined criteria. If it does not meet the criteria, it is determined that the quality of the semiconductor device manufactured in the mass-production line is different from that of the trial-production, and the apparatus-difference correction information for correcting the difference in the quality is retrieved and obtained as described below.

First, the retrieval request data is generated by the retrieval request data generating means 42. The retrieval request data is the product name or the wafer ID for instance. The generated retrieval request data is accepted by the retrieval request data input accepting means 35.

Thereafter, as described in the third embodiment, the accepted retrieval request data is sent via the network 20 to the remote computer 50 by the retrieval request data sending means 38. If the sent retrieval request data is received by the retrieval request data receiving means 52 of the remote computer 50 via the network 20, the apparatus-difference correction information registered in the database 40 is retrieved by the data retrieval means 53 by using the received retrieval request data as the retrieval key, and the apparatus-difference correction information as the retrieval result data is sent to the mass-production managing computer 30 via the network 20 by the retrieval result data sending means 54. In the case where a plurality of pieces of the apparatus-difference correction information are registered, they are retrieved and outputted by the data retrieval means 36 in order from the latest one registered, for instance. The sent apparatus-difference correction information as the retrieval result data is received by the retrieval result data receiving means 39 of the mass-production managing computer 30 via the network 20, and the received apparatus-difference correction information is stored in the storage device 33 by the retrieval result data storing means 37. The stored apparatus-difference correction information is read by the recipe modifying means 62, and the recipe data is modified by the recipe modifying means 62 based on the read apparatus-difference correction information. The modified recipe data is sent to the manufacturing apparatus 7 by the modified recipe sending means 63. The sent modified recipe data is received by the modified recipe data receiving means 72 of the manufacturing apparatus 7, and the received modified recipe data is stored in the storage device 74 by the recipe rewriting means 73. Thus, the recipe data of the manufacturing apparatus 7 is rewritten.

Thereafter, the process is performed by the manufacturing apparatus 7 based on the modified recipe data, and the test and inspection are performed by the test/inspection apparatus 5. As described above, the test/inspection result data is sent to the test/inspection result receiving means 41, where it is determined whether or not the test/inspection result data meets the predetermined criteria. If it meets the criteria, the mass-production transfer is completed by determining that the difference in the quality has been corrected. If it does not meet the criteria, the apparatus-difference correction information is retrieved and obtained again.

As described above, according to the seventh embodiment, the quality information and recipe information are transferred and the apparatus-difference correction information generated or obtained in the trial-production stage is also transferred on demand on the mass-production transfer from the trial-production line to the mass-production line. And in the case where the quality of the semiconductor device manufactured in the mass-production line is different from that of the trial-production, the apparatus-difference correction information for correcting the difference in the quality is retrieved and obtained from the database 40, and the recipe data of the manufacturing apparatus 7 is modified based on the obtained apparatus-difference correction information so as to manufacture the semiconductor device using the modified recipe data. Therefore, it is possible to automatically perform the mass-production transfer from the trial-production line to the mass-production line without depending on the engineers engaged in the development/trial-production of the new product and the engineer of the mass-production line so as to allow the smooth mass-production transfer.

Next, a transformed example of the seventh embodiment will be described.

The above-mentioned seventh embodiment described the case of modifying the recipe data of the manufacturing apparatus based on the obtained apparatus-difference correction information. In this transformed example, as in the transformed examples of the fifth and sixth embodiments, a description will be given as to the case of changing the parameter set in the manufacturing apparatus based on the obtained apparatus-difference correction information. Hereafter, a description will be given by centering on the portion different from the seventh embodiment.

Figure 19:
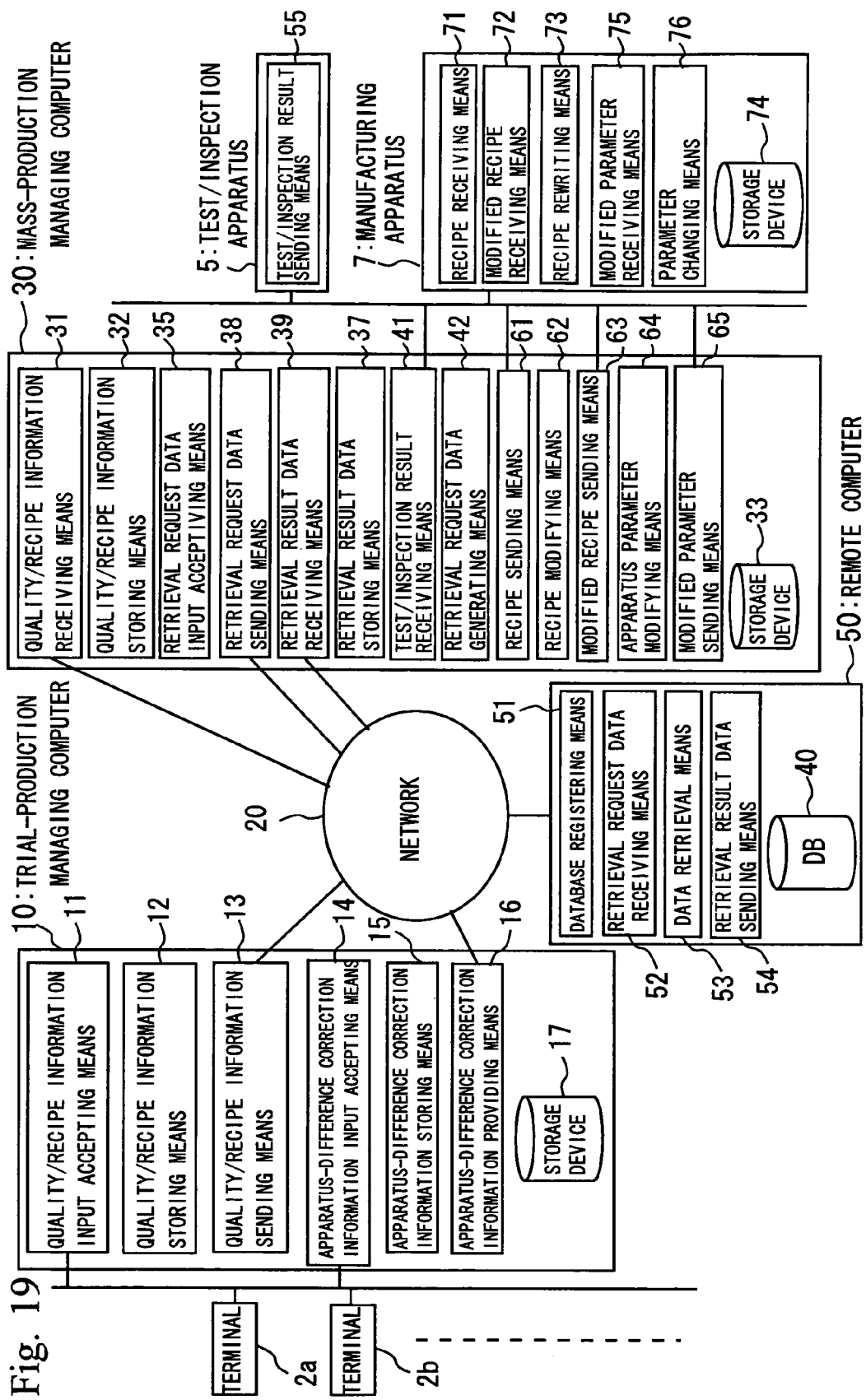
FIG. 19 is a block diagram for describing a transformed example of the seventh embodiment of the present invention.

FIG. 19 is a block diagram for describing the transformed example of the seventh embodiment of the present invention.

As described in the transformed examples of the fifth and sixth embodiments, the mass-production managing computer 30 further comprises the apparatus parameter modifying means 64 and modified parameter sending means 65. And the manufacturing apparatus 7 connected to the mass-production managing computer 30 via the network further comprises the modified parameter receiving means 75 and parameter changing means 76.

Next, a description will be given as to the retrieval and obtaining of the apparatus-difference correction information and change of the parameter on the manufacturing apparatus.

If the retrieval request data generating means 42 of the mass-production managing computer 30 determines that the test/inspection result data does not meet predetermined criterion and the generated retrieval request data is accepted by the retrieval request data input accepting means 35, as described in the second embodiment, the accepted retrieval request data is sent to the remote computer 50 by the retrieval request data sending means 38. If the sent retrieval request data is received by the retrieval request data receiving means 52, the apparatus-difference correction information registered in the database 40 is retrieved by the data retrieval means 53 by using the received retrieval request data as the retrieval key, and the apparatus-difference correction information as the retrieval result data is sent to the mass-production managing computer 30 via the network 20 by the retrieval result data sending means 54. The sent retrieval result data is received by the retrieval result data receiving means 39, and the received retrieval result data is stored in the storage device 33 by the retrieval result data storing means 37. The parameter data set in the manufacturing apparatus 7 and stored in the storage device 33 in advance and the apparatus-difference correction information stored in the storage device 33 by the retrieval result data storing means 37 are read from the storage device 33 by the apparatus parameter modifying means 64, and the parameter data is modified based on the apparatus-difference correction information. The modified parameter data is sent to the manufacturing apparatus 7 by the modified parameter sending means 65. The sent modified parameter is received by the modified parameter receiving means 75 of the manufacturing apparatus 7, and the received modified parameter data is stored in the storage device 74 by the parameter changing means 76. Thus, the parameter data set in the manufacturing apparatus 7 is changed.

According to this transformed example, it is also possible to automatically perform the mass-production transfer from the trial-production line to the mass-production line without depending on the engineers engaged in the development/trial-production of the new product and the engineer of the mass-production line so as to allow a smooth mass-production transfer.

Eighth Embodiment

FIG. 20 is a diagram showing the apparatus-difference correction information registered in the database according to an eighth embodiment of the present invention.

As shown in FIG. 20, the apparatus-difference correction information is registered by associating priorities such as A, B and C therein. The priorities are decided with reference to a degree of influence exerted on the quality of the wafer by the apparatus-difference correction information. The priorities are inputted together with the product name or wafer ID on inputting the apparatus-difference correction information with the terminals 2a, 2b . . . or the EES 80.

For instance, as for a film forming process with a lot of deposit on side walls inside the chamber, there are the cases where a high priority is given to the operation detail data on in-situ dry cleaning of the deposit, wet cleaning of the chamber and NPW in conjunction with the cleaning.

As for the etching process for detecting an end point with the light emitting monitor in which the end point is difficult to detect for instance, there are the cases where a high priority is given to process monitor information on the light emitting monitor.

In the case of retrieving the apparatus-difference correction information registered in the database 40, the data retrieval means 36, 16c and 53 retrieve the apparatus-difference correction information by using the retrieval request data as the retrieval key and perform the retrieval in order of lowering priority from the highest priority. In the case where the priorities are given as shown in FIG. 17, the data retrieval means 36, 16c and 53 first output adjustment data of the line width of priority A. Thereafter, if there is a retrieval request of the same retrieval request data, the adjustment data in the spacer form of priority B is outputted.

Thus, the engineers engaged in the development/trial-production can obtain the apparatus-difference correction information on the mass-production managing computer 30 according to set-up priorities. Therefore, it is possible to reduce the hours until the quality of the semiconductor device manufactured in the mass-production line becomes equivalent to that of the trial-production. Thus, the smooth mass-production transfer and manufacture of the semiconductor device become feasible.

Ninth Embodiment

Figure 21:
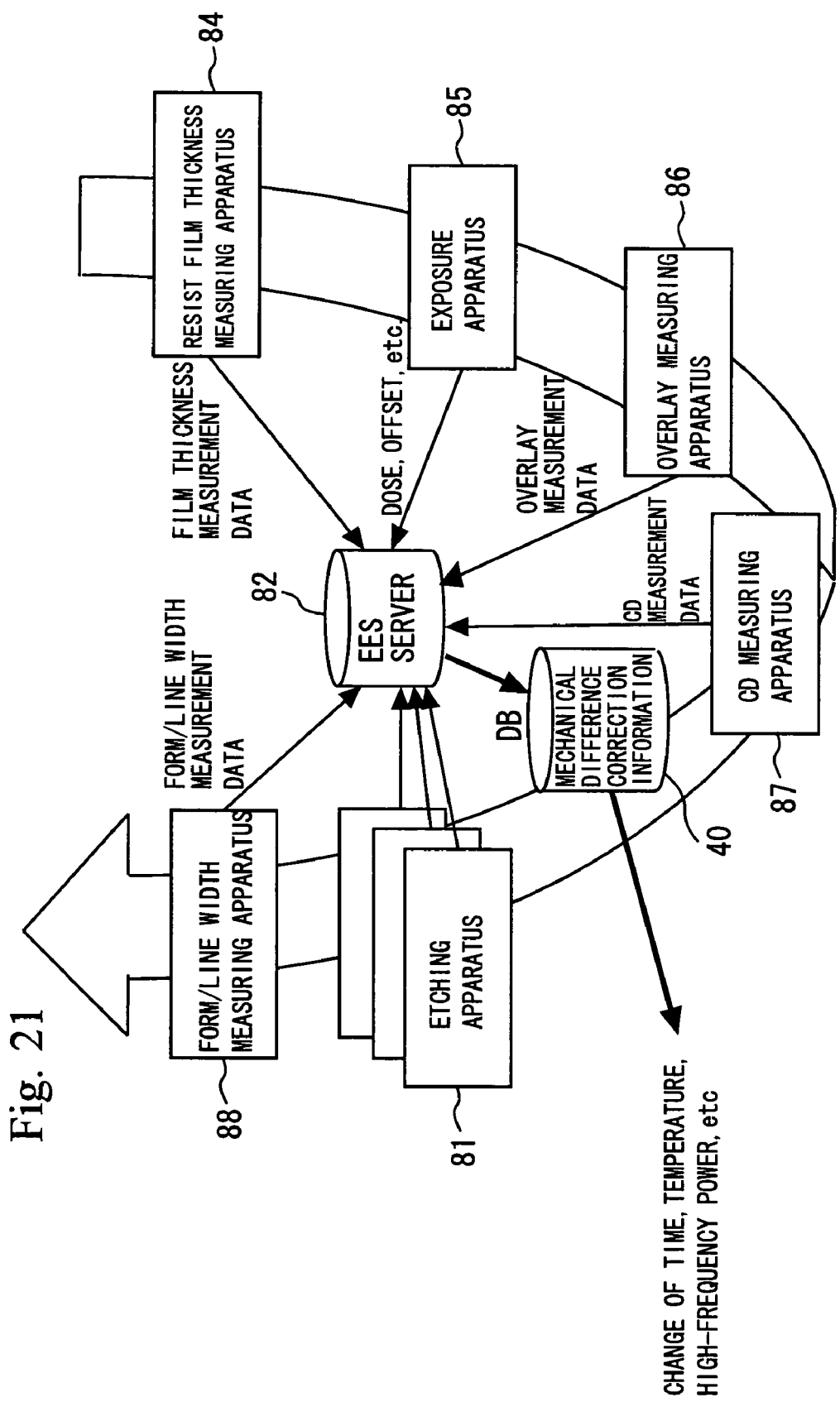
FIG. 21 is a conceptual diagram for describing apparatus-difference correction of etching process according to a ninth embodiment of the present invention.

FIG. 21 is a conceptual diagram for describing apparatus-difference correction of the etching process according to a ninth embodiment of the present invention. The sending and receiving of the apparatus-difference correction information is the same as those in the fifth to eighth embodiments, and so a detailed description thereof will be omitted.

As shown in FIG. 21, the data for deciding processing conditions of the etching is sent by the EES server 82 from apparatuses related to the etching process (hereafter, referred to as "related apparatuses"). The related apparatuses are, for instance, resist film thickness measuring apparatus 84, an exposure apparatus 85, an overlay measuring apparatus 86, a CD (critical dimension) measuring apparatus 87, a form and line width measuring apparatus 88 and so on, and they are connected to the EES server 82 via the network.

The related apparatuses have the data sending means which send various kinds of data to the EES server 82 via the network. To be more precise, film thickness measurement data is sent from the resist film thickness measuring apparatus 84, the data such as Dose and Offset is sent from the exposure apparatus 85, overlay measurement data is sent from the overlay measuring apparatus 86, CD measurement data is sent from the CD measuring apparatus 87, and form and line width measurement data is sent from the form and line width measuring apparatus 88. The etching apparatus as the manufacturing apparatus 81 also sends the DEE data as described in the fourth embodiment and also sends the data indicating temperatures (chuck temperature, chamber wall temperature, cooling water temperature, heat exchanger temperature and so on), a gas flow rate, high-frequency power and so on thereto.

The EES server 82 has the data receiving means which receives various kinds of data sent from the related apparatuses. As described in the fourth embodiment, the EES server 82 generates the apparatus detail data from the DEE data received from the etching apparatus 81. Furthermore, the EES server 82 sends the received various kinds of data and generated apparatus detail data to the trial-production managing computer 10. The sent data is accepted as the apparatus-difference correction information by the apparatus-difference correction information input accepting means 14, and registered in the database 40. The apparatus-difference correction information is the information for, in the case where the inter-apparatus apparatus-difference exists as in the case of using the etching apparatuses of different manufacturers for instance, correcting the difference between the apparatuses due to the inter-apparatus apparatus-difference, that is, obtaining the equivalent quality (form and line width).

After performing the etching by using the etching apparatus 7 which is the manufacturing apparatus 7 of the mass-production line, the quality is determined by measuring the form and line width by using the form and line width measuring apparatus 5. The quality is determined by comparing the transferred quality information to measurement results. If determined that the quality is different, the difference in the quality is corrected by modifying an etching recipe or changing the apparatus parameter based on the apparatus-difference correction information as described in the fifth to eighth embodiments or their transformed examples. For instance, the equivalent quality (form and line width) can be achieved by changing the chuck temperature and high-frequency power set in the recipe.

Thus, it is possible, according to the ninth embodiment, to obtain the data obtained by the relative apparatuses 84 to 88 and grasp the process conditions of the etching apparatus including the obtained data.

Next, a transformed example of the ninth embodiment will be described.

Figure 22:
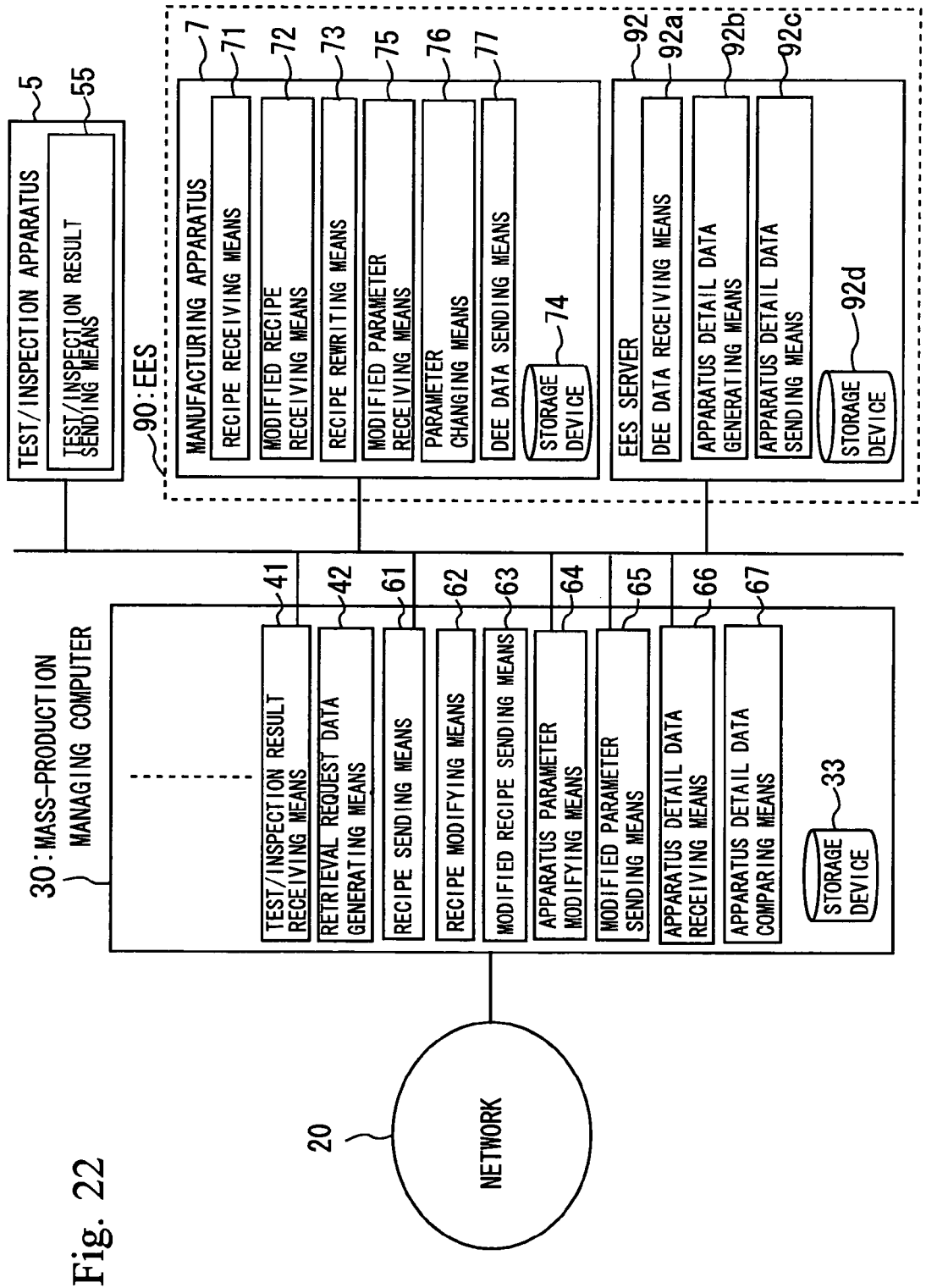
FIG. 22 is a block diagram for describing a transformed example of the ninth embodiment of the present invention.

FIG. 22 is a block diagram for describing the transformed example of the ninth embodiment of the present invention.

As shown in FIG. 22, this transformed example generates the apparatus detail data of the manufacturing apparatus 7 by exploiting an EES 90, and compares the generated apparatus detail data to the apparatus detail data as the apparatus-difference correction information. The EES 90 comprises the manufacturing apparatus 7 and an EES server 92. As with the manufacturing apparatus 7, the EES server 92 is connected to the mass-production managing computer 30 via the network.

The manufacturing apparatus 7 further comprises DEE data sending means 77 for sending the DEE data to the EES server 92. The DEE data is the same as that in the fourth embodiment, and so a description thereof will be omitted.

The EES server 92 comprises DEE data receiving means 92a for receiving the DEE data sent from the DEE data sending means 77, apparatus detail data generating means 92b for selecting necessary DEE data from the received DEE data, for generating the apparatus detail data from the selected DEE data and storing the generated apparatus detail data in a storage device 92d, and apparatus detail data sending means 92c for reading the stored apparatus detail data from the storage device 92d and for sending the read apparatus detail data to the mass-production managing computer 30 via the network.

The apparatus detail data generating means 92b generates wafer transfer time, wafer stopping time, and time from carriage into the chamber to an end of the process or carrying out (wafer processing time) from actuating signals and so on of valves as the apparatus detail data.

The mass-production managing computer 30 further comprises apparatus detail data receiving means 66 for receiving via the network the apparatus detail data sent by the apparatus detail data sending means 92c, and apparatus detail data comparing means 67 for comparing the received apparatus detail data to the apparatus detail data obtained as the apparatus-difference correction information which is the retrieval result. Based on a comparison result of the apparatus detail data comparing means 67, the recipe data is modified by the recipe modifying means 62 or the parameter data is modified by the apparatus parameter modifying means 64.

Thus, according to this transformed example, it is possible to obtain the apparatus detail data of the manufacturing apparatus 7 of the mass-production line by exploiting the EES 90 and compare the obtained apparatus detail data to the apparatus detail data as the apparatus-difference correction information so as to grasp the difference between the devices and render the qualities equivalent by modifying the recipe or changing the parameter. It is possible, by comparing the apparatus detail data, to grasp that the difference in the quality is caused by an etching rate difference due to a difference in wafer temperature between the etching apparatuses, for instance.

According to this transformed example, the apparatus detail data comparing means 67 compared the apparatus detail data received from the EES server 92 to the apparatus detail data as the apparatus-difference correction information. However, it is not limited thereto but a comparison can be made to the apparatus detail data received before as to the same manufacturing apparatus 7. Thus, it is possible to grasp the inner apparatus-difference and correct the difference in the quality in a short period of time. For instance, it is possible to grasp that the difference in the quality is caused by the etching rate difference due to the moment-to-moment change of the wafer temperature in the etching apparatus (inner apparatus-difference).

This invention, when practiced illustratively in the manner described above, provides the following major effects:

the present invention is capable of the smooth mass-production transfer of the semiconductor device by transferring the apparatus-difference correction information in addition to the quality information and recipe information. It can also conform the quality of the semiconductor device manufactured in the mass-production process to the mass-production-transferred quality information by modifying recipe data based on the apparatus-difference correction information as the retrieval result data, thus allowing the smooth mass-production transfer of the semiconductor device.

Further, the present invention is not limited to these embodiments, but variations and modifications may be made without departing from the scope of the present invention.

The entire disclosure of Japanese Patent Applications No. 2003-432464 and No. 2003-432465 filed on Dec. 26, 2003 containing specification, claims, drawings and summary are incorporated herein by reference in its entirety.

What is claimed is:

1. A mass-production transfer support system having a mass-production transfer source managing computer for managing information generated or obtained in a trial-production process of a semiconductor device, the mass-production transfer source managing computer being connected via a network to a mass-production transfer destination managing computer for managing a mass-production process of the semiconductor device, wherein the mass-production transfer source managing computer comprises:
quality/recipe information input accepting means for accepting an input of quality information representing a quality of the semiconductor device and an input of recipe information for realizing the quality of the semiconductor device;
quality/recipe information sending means for sending the quality and recipe information accepted by the quality/recipe information input accepting means to the mass-production managing computer via the network;
apparatus-difference correction information input accepting means for accepting an input of apparatus-difference correction information for correcting a difference in the quality of the semiconductor device associated with an apparatus-difference between semiconductor manufacturing apparatuses in charge of an element process of the semiconductor device;
apparatus-difference correction information storing means for storing the apparatus-difference correction information accepted by the apparatus-difference correction information input accepting means in a predetermined storage device; and
apparatus-difference correction information providing means for reading from the storage device the apparatus-difference correction information stored in the storage device by the apparatus-difference correction information storing means, and for storing the apparatus-difference correction information in a database accessible by the mass-production transfer destination managing computer, and the mass-production transfer destination managing computer comprises:
quality/recipe information receiving means for receiving via the network the quality and recipe information sent by the quality/recipe information sending means of the mass-production transfer source managing computer; and
quality and recipe information storing means for storing the quality and recipe information received by the quality/recipe information receiving means in the predetermined storage device.

2. The mass-production transfer support system according to claim 1, wherein
the database is connected to the mass-production transfer destination managing computer, the apparatus-difference correction information providing means of the mass-production transfer source managing computer reads from the storage device the apparatus-difference correction information stored in the storage device by the apparatus-difference correction information storing means, and sends the apparatus-difference correction information to the mass-production transfer destination managing computer via the network, and the mass-production transfer destination managing computer comprises:

database registering means for registering the apparatus-difference correction information received via the network in the database;

retrieval request data input accepting means for accepting an input of predetermined retrieval request data; and data retrieval means for retrieving the apparatus-difference correction information stored in the database by using the retrieval request data accepted by the retrieval request data input accepting means as a retrieval key, and for outputting retrieval result data.

3. The mass-production transfer support system according to claim 1, wherein the database is connected to the mass-production transfer source managing computer, the apparatus-difference correction information providing means of the mass-production transfer source managing computer comprises:

database registering means for reading from the storage device the apparatus-difference correction information stored in the storage device by the apparatus-difference correction information storing means, and for registering the read apparatus-difference correction information in the database; and data retrieval means for, in receiving retrieval request data via the network, retrieving the apparatus-difference correction information stored in the database by using the received retrieval request data as a retrieval key, and for sending the retrieval result data to the mass-production transfer destination managing computer via the network, and the mass-production transfer destination managing computer comprises:

retrieval request data input accepting means for accepting an input of the retrieval request data;

retrieval request data sending means for sending the retrieval request data accepted by the retrieval request data input accepting means to the mass-production transfer source managing computer via the network; and retrieval result data receiving means for receiving the retrieval result data via the network, and for outputting the received retrieval result data.

4. The mass-production transfer support system according to claim 1, wherein the database is connected to a remote computer connected to the network, the remote computer being a computer different from both the mass-production transfer source managing computer and the mass-production transfer destination managing computer, the apparatus-difference correction information providing means of the mass-production transfer source managing computer reads from the storage device the apparatus-difference correction information stored in the storage device by the apparatus-difference correction information storing means, and sends the apparatus-difference correction information to the remote computer via the network, the remote computer comprises:

database registering means for registering the apparatus-difference correction information received via the network in the database; and data retrieval means for, in receiving retrieval request data via the network, retrieving the apparatus-difference correction information stored in the database by using the retrieval request data as a retrieval key, and for sending retrieval result data to the mass-production transfer destination managing computer via the network, and the mass-production transfer destination managing computer comprises:

retrieval request data input accepting means for accepting an input of the retrieval request data;

retrieval request data sending means for sending the retrieval request data accepted by the retrieval request data input accepting means to the remote computer via the network; and retrieval result data receiving means for receiving the retrieval result data via the network and for outputting the retrieval result data.

5. The mass-production transfer support system according to claim 1, wherein the mass-production transfer destination managing computer comprises:

apparatus-difference correction information input accepting means for accepting an input of apparatus-difference correction information obtained in the mass-production process;

apparatus-difference correction information storing means for storing the apparatus-difference correction information accepted by the apparatus-difference correction information input accepting means in a storage device; and apparatus-difference correction information providing means for reading from the storage device the apparatus-difference correction information stored by the apparatus-difference correction information storing means, and for registering the apparatus-difference correction information in the database accessible by the mass-production transfer source managing computer.

6. The mass-production transfer support system according to claim 2, wherein the mass-production transfer destination managing computer further comprises:

short apparatus-difference correction information request data input accepting means for accepting an input of short apparatus-difference correction information request data for requesting short apparatus-difference correction information other than the apparatus-difference correction information registered in the database; and short apparatus-difference correction information request data sending means for sending the short apparatus-difference correction information request data accepted by the short apparatus-difference correction information request data input accepting means to the mass-production transfer source managing computer via the network, the mass-production transfer source managing computer further comprises:
  short apparatus-difference correction information request data receiving means for receiving the short apparatus-difference correction information request data via the network; and
  short apparatus-difference correction information providing means for retrieving the apparatus-difference correction information stored in the storage device by using the short apparatus-difference correction information request data as the retrieval key, and for sending the short apparatus-difference correction information obtained by retrieving to the mass-production transfer destination managing computer via the network, and
the database registering means of the mass-production transfer destination managing computer receives the short apparatus-difference correction information via the network, and registers the short apparatus-difference correction information in the database.

7. The mass-production transfer support system according to claim 6, wherein
the mass-production transfer source managing computer further comprises additional apparatus-difference correction information input accepting means for accepting an input of additional apparatus-difference correction information in the case where the short apparatus-difference correction information is not stored in the storage device, and
the short apparatus-difference correction information providing means sends the additional apparatus-difference correction information accepted by the additional apparatus-difference correction information input accepting means to the mass-production transfer destination managing computer.

8. The mass-production transfer support system according to claim 3, wherein
the mass-production transfer destination managing computer further comprises:
  short apparatus-difference correction information request data input accepting means for accepting an input of short apparatus-difference correction information request data for requesting short apparatus-difference correction information other than the apparatus-difference correction information registered in the database; and
  short apparatus-difference correction information request data sending means for sending the short apparatus-difference correction information request data accepted by the short apparatus-difference correction information request data input accepting means to the mass-production transfer source managing computer via the network, and
the mass-production transfer source managing computer further comprises:
  short apparatus-difference correction information request data receiving means for receiving the short apparatus-difference correction information request data via the network; and
  database registering means of the mass-production transfer source managing computer for retrieving the apparatus-difference correction information stored in the storage device by using the short apparatus-difference correction information request data as the retrieval key, and for registering the short apparatus-difference correction information obtained by retrieving in the database.

9. The mass-production transfer support system according to claim 8, wherein
the mass-production transfer source managing computer further comprises additional apparatus-difference correction information input accepting means for accepting an input of additional apparatus-difference correction information in the case where the short apparatus-difference correction information is not stored in the storage device, and
the database registering means registers the additional apparatus-difference correction information accepted by the additional apparatus-difference correction information input accepting means in the database.

10. The mass-production transfer support system according to claim 4, wherein
the mass-production transfer destination managing computer further comprises:
  short apparatus-difference correction information request data input accepting means for accepting an input of the short apparatus-difference correction information request data for requesting short apparatus-difference correction information other than the apparatus-difference correction information registered in the database; and short apparatus-difference correction information request data sending means for sending the short apparatus-difference correction information request data accepted by the short apparatus-difference correction information request data input accepting means to the mass-production transfer source managing computer via the network,
the mass-production transfer source managing computer further comprises:
  short apparatus-difference correction information request data receiving means for receiving the short apparatus-difference correction information request data via the network; and
  short apparatus-difference correction information providing means for retrieving the apparatus-difference correction information stored in the storage device by using the short apparatus-difference correction information request data as the retrieval key, and for sending the short apparatus-difference correction information obtained by the retrieving to the remote computer via the network, and
the database registering means of the remote computer receives the short apparatus-difference correction information via the network, and registers the short apparatus-difference correction information in the database.

11. The mass-production transfer support system according to claim 10, wherein
the mass-production transfer source managing computer further comprises additional apparatus-difference correction information input accepting means for accepting an input of additional apparatus-difference correction information in the case where the short apparatus-difference correction information is not stored in the storage device, and
the short apparatus-difference correction information providing means sends the additional apparatus-difference correction information accepted by the additional apparatus-difference correction information input accepting means to the remote computer.

12. A semiconductor manufacturing system having a trial-production managing computer for managing information generated or obtained in a trial-production process of a semiconductor device connected via a network to a mass-production managing computer for managing a mass-production process of the semiconductor device, wherein
the trial-production managing computer comprises:
quality/recipe information input accepting means for accepting an input of quality information representing a quality of a semiconductor device and an input of recipe information for realizing the quality of the semiconductor device;
quality/recipe information sending means for sending the quality and recipe information accepted by the quality/recipe information input accepting means to the mass-production managing computer via the network;
apparatus-difference correction information input accepting means for accepting an input of apparatus-difference correction information for correcting a difference in the quality of the semiconductor device associated with an apparatus-difference between semiconductor manufacturing apparatuses in charge of an element process of the semiconductor device;
apparatus-difference correction information storing means for storing the apparatus-difference correction information accepted by the apparatus-difference correction information input accepting means in a storage device; and
apparatus-difference correction information providing means for reading from the storage device the apparatus-difference correction information stored in the storage device by the apparatus-difference correction information storing means, and for storing the apparatus-difference correction information in a database accessible by the mass-production managing computer,
the mass-production managing computer comprises:
quality/recipe information receiving means for receiving via the network the quality and recipe information sent by the quality/recipe information sending means;
quality/recipe information storing means for storing the quality and recipe information received by the quality/recipe information receiving means in a storage device;
recipe data sending means for reading from the storage device recipe data out of the recipe information stored in the storage device by the quality/recipe information storing means, and for sending the recipe data to the semiconductor manufacturing apparatus in the mass-production process;
retrieval request data generating means for reading from the storage device the quality information stored in the storage device by the quality/recipe information storing means, and for comparing the quality information with a quality of the semiconductor device manufactured by the semiconductor manufacturing apparatus in the mass-production process, and for generating retrieval request data in the case where they are different;
retrieval result data obtaining means for retrieving the apparatus-difference correction information stored in the database by using the retrieval request data generated by the retrieval request data generating means as a retrieval key, and for obtaining retrieval result data;
recipe modifying means for modifying the recipe data based on the retrieval result data obtained by the retrieval result data obtaining means; and
modified recipe sending means for sending the modified recipe data modified by the recipe modifying means to the semiconductor manufacturing apparatus in the mass-production process, and
the semiconductor manufacturing apparatus in the mass-production process comprises:
modified recipe receiving means for receiving the modified recipe data sent by the modified recipe sending means; and
recipe rewriting means for rewriting the recipe data of the semiconductor manufacturing apparatus by storing the modified recipe data received by the modified recipe receiving means in a storage device.

13. The semiconductor manufacturing system according to claim 12, wherein
the mass-production managing computer further comprises examination/test result receiving means for receiving examination/test results sent by a semiconductor examination/test device in the mass-production process, and
the retrieval request data generating means compares the quality information read from the storage device with the examination/test results received by the examination/test result receiving means, and generates the retrieval request data.

14. The semiconductor manufacturing system according to claim 12, wherein
the mass-production managing computer further comprises:
apparatus parameter modifying means for modifying parameter data for the semiconductor manufacturing apparatus in the mass-production process based on the retrieval result data obtained by the retrieval result data obtaining means; and
modified parameter sending means for sending modified parameter data modified by the apparatus parameter modifying means to the semiconductor manufacturing apparatus in the mass-production process, and
the semiconductor manufacturing apparatus in the mass-production process further comprises:
modified parameter receiving means for receiving the modified parameter data sent by the modified parameter sending means; and
parameter changing means for changing the parameter data of the semiconductor manufacturing apparatus by storing the modified parameter data received by the modified parameter receiving means in a storage device.

15. The semiconductor manufacturing system according to claim 12, further comprising apparatus-difference correction information generating means connected to the trial-production managing computer via the network and for generating the apparatus-difference correction information, wherein
the apparatus-difference correction information generating means comprises:
event data receiving means for receiving detail event data of the semiconductor manufacturing apparatus in the trial-production process;
apparatus detail data generating means for generating apparatus detail data from the detailed event data received by the event data receiving means; and
apparatus detail data sending means for sending the apparatus detail data generated by the apparatus detail data generating means to the trial-production managing computer, and the apparatus-difference correction information input accepting means of the trial-production managing computer receives the apparatus detail data sent by the apparatus detail data sending means, and accepts the apparatus detail data as the apparatus-difference correction information.

16. The semiconductor manufacturing system according to claim 12, wherein the apparatus-difference correction information input accepting means of the trial-production managing computer accepts an input of a product name or a wafer ID together with the apparatus-difference correction information, the apparatus-difference correction information providing means of the trial-production managing computer stores in the database the apparatus-difference correction information by the product name or wafer ID accepted by the apparatus-difference correction information input accepting means, and the retrieval request data generating means of the mass-production managing computer generates the product name or wafer ID as the retrieval request data.

17. The semiconductor manufacturing system according to claim 16, wherein the apparatus-difference correction information input accepting means of the trial-production managing computer further accepts an input of a priority of the apparatus-difference correction information together with the product name or wafer ID, and the apparatus-difference correction information providing means of the trial-production managing computer stores the apparatus-difference correction information in the database by associating the apparatus-difference correction information with the priority accepted by the apparatus-difference correction information input accepting means.

* * * * *